United States Patent
Aristarkhov

(10) Patent No.: US 12,149,578 B2
(45) Date of Patent: Nov. 19, 2024

(54) VIDEO STREAMING TECHNIQUES FOR APPLICATIONS AND WORKLOADS EXECUTED IN THE CLOUD

(71) Applicant: Intel Corporation, Santa Clara, CA (US)

(72) Inventor: Vasily Aristarkhov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 591 days.

(21) Appl. No.: 17/341,056

(22) Filed: Jun. 7, 2021

(65) Prior Publication Data

US 2022/0394072 A1 Dec. 8, 2022

(51) Int. Cl.
| | | |
|---|---|---|
| *H04L 65/70* | (2022.01) | |
| *H04L 65/75* | (2022.01) | |
| *H04N 19/124* | (2014.01) | |
| *H04N 19/159* | (2014.01) | |
| *H04N 19/176* | (2014.01) | |
| *H04N 19/177* | (2014.01) | |
| *H04N 19/36* | (2014.01) | |

(52) U.S. Cl.
CPC .............. *H04L 65/70* (2022.05); *H04L 65/75* (2022.05); *H04N 19/124* (2014.11); *H04N 19/159* (2014.11); *H04N 19/176* (2014.11); *H04N 19/177* (2014.11); *H04N 19/36* (2014.11)

(58) Field of Classification Search
None
See application file for complete search history.

(56) References Cited

U.S. PATENT DOCUMENTS

| | | | |
|---|---|---|---|
| 7,360,230 B1* | 4/2008 | Paz | H04N 7/17318 375/E7.254 |
| 2006/0184982 A1* | 8/2006 | Paz | H04N 7/17336 725/100 |
| 2021/0099713 A1* | 4/2021 | Cerny | H04N 19/107 |

OTHER PUBLICATIONS

Shah et al., "A cloud-based transcoding with partial content protection scheme", Aug. 1, 2016, IEEE, 2016 Sixth International Conference on Innovative Computing Technology (INTECH) (2016, pp. 116-121) (Year: 2016).*
Non-Published commonly owned U.S. Appl. No. 17/210,977, filed Mar. 24, 2021, 82 pages, Intel Corporation.

* cited by examiner

*Primary Examiner* — Davoud A Zand
(74) *Attorney, Agent, or Firm* — Hanley, Flight & Zimmerman, LLC

(57) ABSTRACT

Described herein are video streaming techniques for applications and workloads executed in the cloud. In one example, the cloud server device encodes display frames using low-delay encoding techniques for transmission to a client device. The cloud server device receives an overlay bitstream from a client device, combines the overlay data with the display frames, and encodes the frames for the viewers using statistics from the display frames encoded for the client device and/or from the overlay data. The cloud server device can then transmit the bitstream to a third device for viewing (e.g., to a viewer device or a streaming server device).

20 Claims, 34 Drawing Sheets

GRAPHICS PROCESSOR INSTRUCTION
FORMATS
700

———————— 128-BIT INSTRUCTION ————————
710

64-BIT COMPACT
INSTRUCTION
730

OPCODE DECODE
740

VIDEO STREAMING TECHNIQUES FOR APPLICATIONS AND WORKLOADS EXECUTED IN THE CLOUD

FIELD

Descriptions are generally related to graphics processing, and more particular descriptions are related to video streaming techniques for applications and workloads executed in the cloud.

BACKGROUND

Graphics processors typically implement processing techniques such as pipelining that attempt to process, in parallel, as much graphics data as possible throughout the different parts of the graphics pipeline. Parallel graphics processors with single instruction, multiple data (SIMD) or single instruction, multiple thread (SIMT) architectures are designed to maximize the amount of parallel processing in the graphics pipeline. In a SIMD architecture, computers with multiple processing elements attempt to perform the same operation on multiple data points simultaneously. In a SIMT architecture, groups of parallel threads attempt to execute program instructions synchronously together as often as possible to increase processing efficiency.

Parallel graphics data processing may be utilized in a variety of graphics applications and workloads, including cloud-based graphics applications such as cloud gaming, game streaming, and remote desktop access. Cloud-based graphics applications and workloads typically involve display capturing, video compression, and transmission over a network to end users. In addition to single person execution, users may share content with others via live streaming or game streaming.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Descriptions of certain details and implementations follow, including non-limiting descriptions of the figures, which may depict some or all examples, and well as other potential implementations.

DETAILED DESCRIPTION

Described herein are video streaming techniques for applications and workloads executed in the cloud.

Conventional game and live streaming techniques involve capturing display and audio, mixing the display and audio with overlays such as self-camera and voice, and streaming the mixed stream to viewers all on the end-user/client device using broadcast or streaming SDKs (software development kits) or other software. However, performing the stream-related operations on the client device has drawbacks. For example, with conventional techniques, the stream sent to viewers is limited to the resolution and quality received by the client device. Additionally, performing streaming-related operations on the client device can be compute intensive. Furthermore, performing such streaming-related operations on the client device fails to take advantage of the differing latency requirements for streamers (e.g., game players or other streamers) and viewers.

In contrast, combining overlay data with capture data and encoding for transmission to viewers in the cloud enables improved encoding for viewers using statistics gathered in the cloud. In one example, the cloud server device encodes display frames using low-delay encoding techniques for transmission to a client device. The cloud server device receives an overlay bitstream from a client device, combines the overlay data with the display frames, and encodes the frames for the viewers using statistics from the display frames encoded for the client device and/or from the overlay data. The cloud server device can then transmit the bitstream to a third device for viewing (e.g., to a viewer device or a streaming server device).

System Overview

Figure 1:
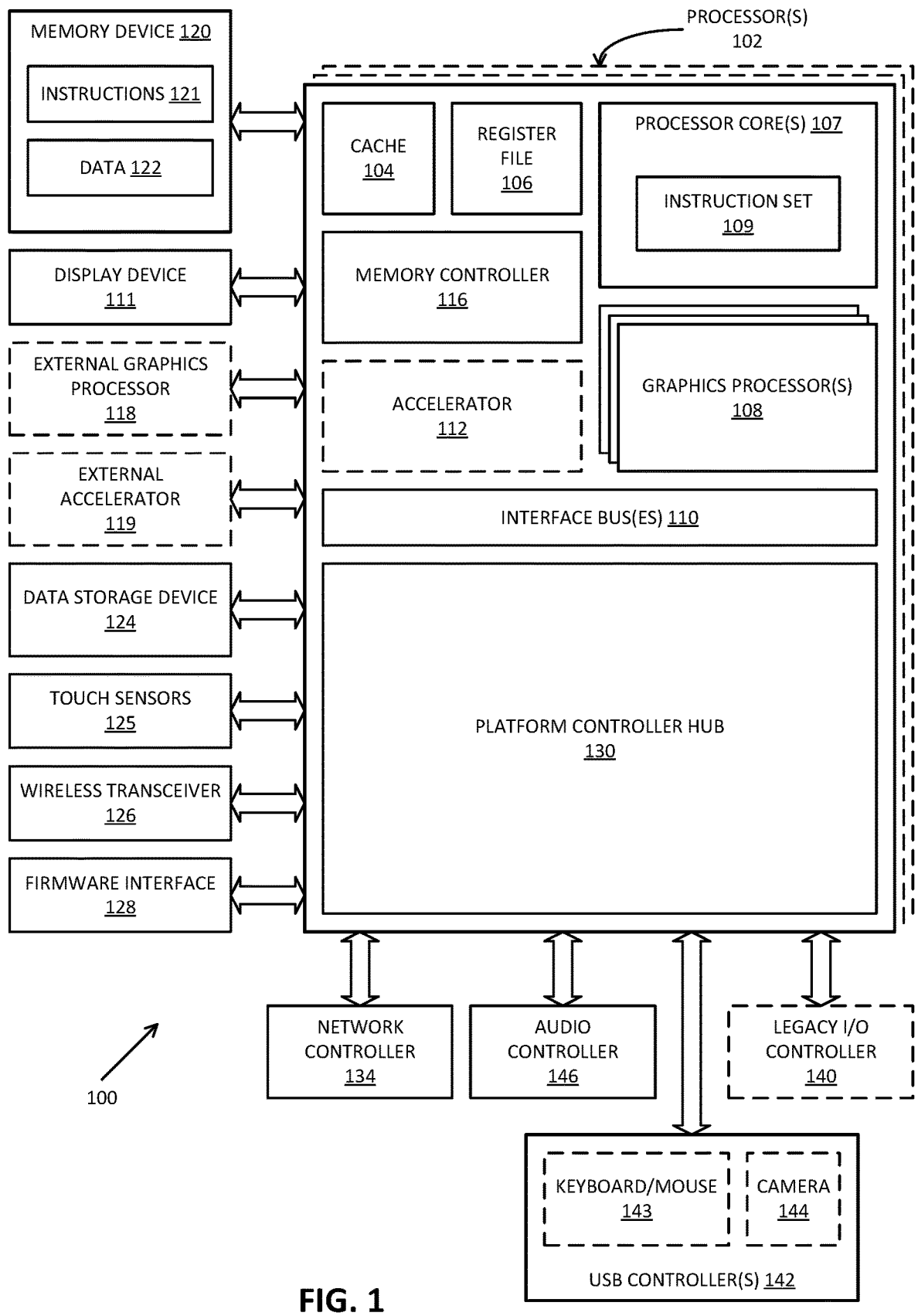
FIG. 1 is a block diagram of a processing system according to an embodiment.

FIG. 1 is a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, embedded DisplayPort, MIPI, HDMI, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA (serial advanced technology attachment)) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs (dual inline memory modules), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs (field programmable gate arrays), ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIGS. 2A-2D illustrate computing systems and graphics processors provided by embodiments described herein. The elements of FIGS. 2A-2D having the same reference numbers (or names) as the elements of any other figure herein can operate or function in any manner similar to that described elsewhere herein, but are not limited to such.

Figure 2A:
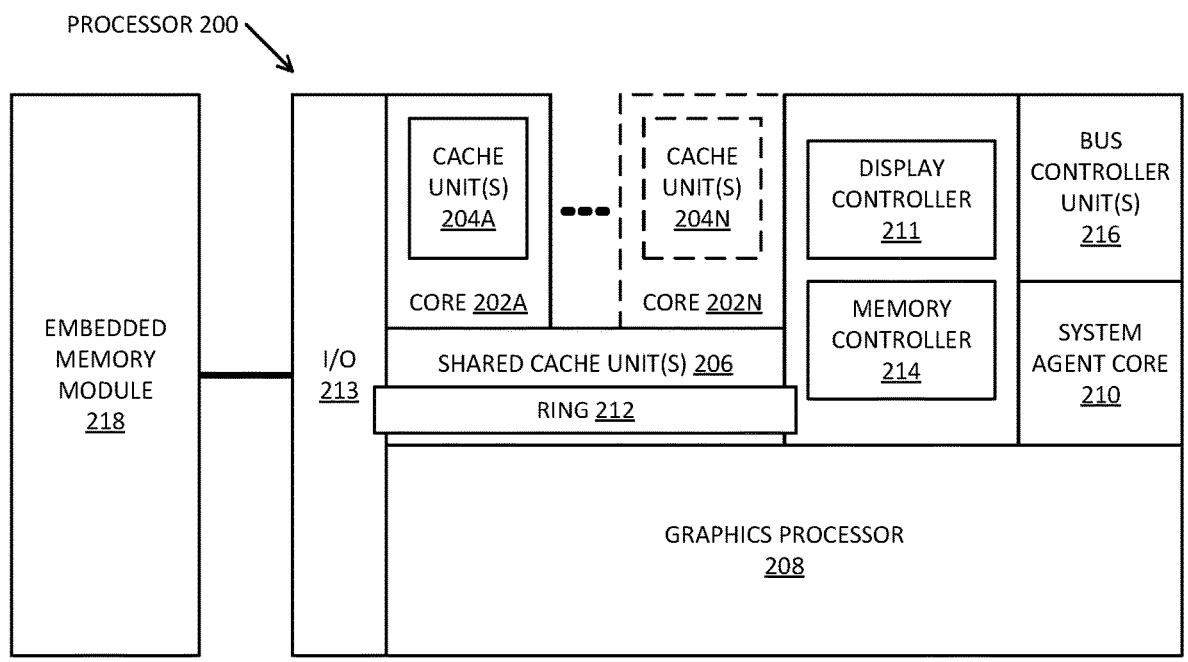
FIGS. 2A-2D illustrate computing systems and graphics processors provided by embodiments described herein.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 can use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
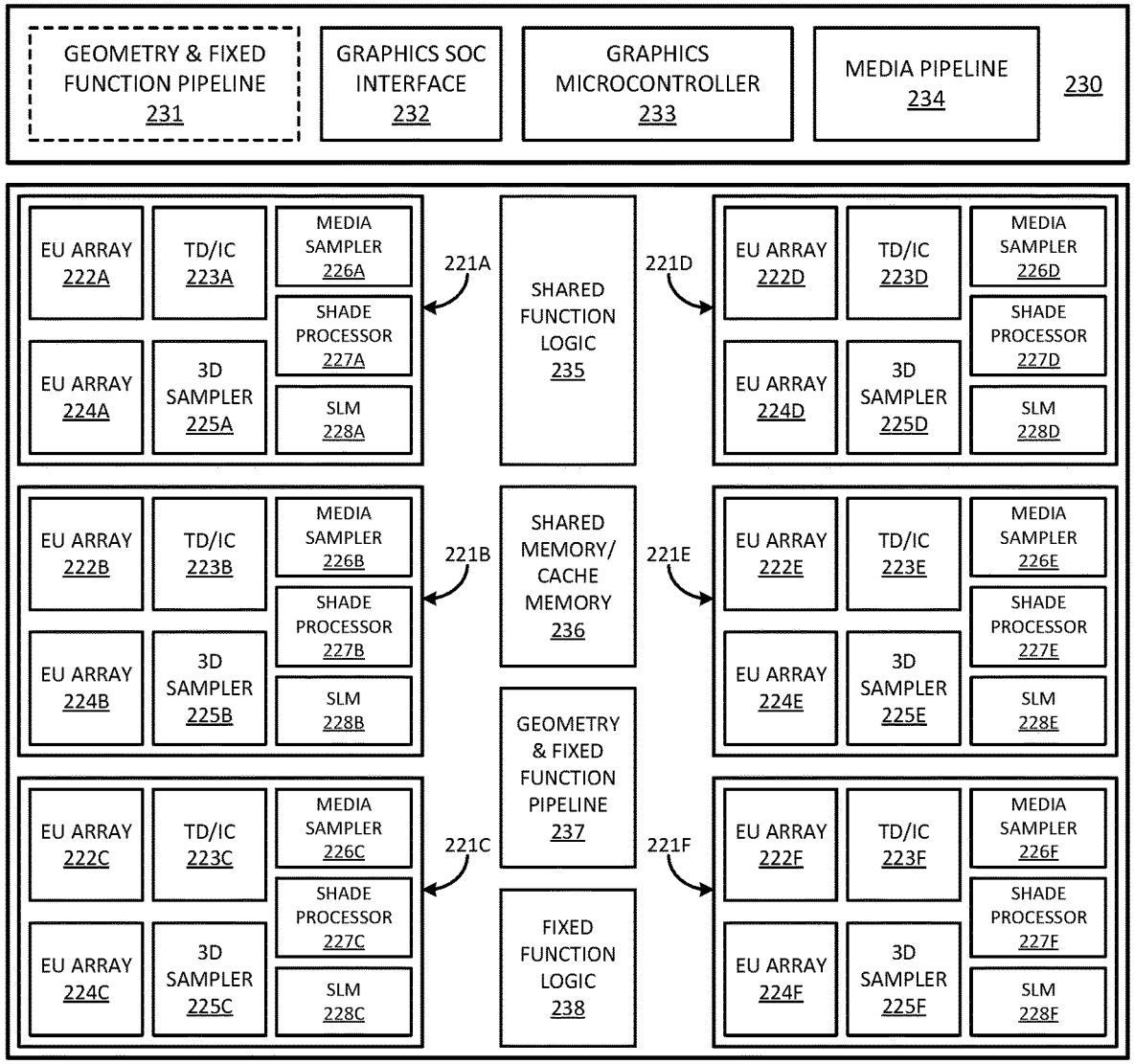

FIG. 2B is a block diagram of hardware logic of a graphics processor core 219, according to some embodiments described herein. Elements of FIG. 2B having the same reference numbers (or names) as the elements of any other figure herein can operate or function in any manner similar to that described elsewhere herein, but are not limited to such. The graphics processor core 219, sometimes referred to as a core slice, can be one or multiple graphics cores within a modular graphics processor. The graphics processor core 219 is exemplary of one graphics core slice, and a graphics processor as described herein may include multiple graphics core slices based on target power and performance envelopes. Each graphics processor core 219 can include a fixed function block 230 coupled with multiple sub-cores 221A-221F, also referred to as sub-slices, that include modular blocks of general-purpose and fixed function logic.

In some embodiments, the fixed function block 230 includes a geometry/fixed function pipeline 231 that can be shared by all sub-cores in the graphics processor core 219, for example, in lower performance and/or lower power graphics processor implementations. In various embodiments, the geometry/fixed function pipeline 231 includes a 3D fixed function pipeline (e.g., 3D pipeline 312 as in FIG. 3 and FIG. 4, described below) a video front-end unit, a thread spawner and thread dispatcher, and a unified return buffer manager, which manages unified return buffers (e.g., unified return buffer 418 in FIG. 4, as described below).

In one embodiment the fixed function block 230 also includes a graphics SoC interface 232, a graphics microcontroller 233, and a media pipeline 234. The graphics SoC interface 232 provides an interface between the graphics processor core 219 and other processor cores within a system on a chip integrated circuit. The graphics microcontroller 233 is a programmable sub-processor that is configurable to manage various functions of the graphics processor core 219, including thread dispatch, scheduling, and preemption. The media pipeline 234 (e.g., media pipeline 316 of FIG. 3 and FIG. 4) includes logic to facilitate the decoding, encoding, pre-processing, and/or post-processing of multimedia data, including image and video data. The media pipeline 234 implement media operations via requests to compute or sampling logic within the sub-cores 221-221F.

In one embodiment the SoC interface 232 enables the graphics processor core 219 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core 219 and CPUs within the SoC. The SoC interface 232 can also implement power management controls for the graphics processor core 219 and enable an interface between a clock domain of the graphic core 219 and other clock domains within the SoC. In one embodiment the SoC interface 232 enables receipt of command buffers from a command streamer and global thread dispatcher that are configured to provide commands and instructions to each of one or more graphics cores within a graphics processor. The commands and instructions can be dispatched to the media pipeline 234, when media operations are to be performed, or a geometry and fixed function pipeline (e.g., geometry and fixed function pipeline 231, geometry and fixed function pipeline 237) when graphics processing operations are to be performed.

The graphics microcontroller 233 can be configured to perform various scheduling and management tasks for the graphics processor core 219. In one embodiment the graphics microcontroller 233 can perform graphics and/or compute workload scheduling on the various graphics parallel engines within execution unit (EU) arrays 222A-222F, 224A-224F within the sub-cores 221A-221F. In this scheduling model, host software executing on a CPU core of an SoC including the graphics processor core 219 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core 219, providing the graphics processor core 219 with the ability to save and restore registers within the graphics processor core 219 across low-power state transitions independently from the operating system and/or graphics driver software on the system.

The graphics processor core 219 may have greater than or fewer than the illustrated sub-cores 221A-221F, up to N modular sub-cores. For each set of N sub-cores, the graphics processor core 219 can also include shared function logic 235, shared and/or cache memory 236, a geometry/fixed function pipeline 237, as well as additional fixed function logic 238 to accelerate various graphics and compute processing operations. The shared function logic 235 can include logic units associated with the shared function logic 420 of FIG. 4 (e.g., sampler, math, and/or inter-thread communication logic) that can be shared by each N sub-cores within the graphics processor core 219. The shared and/or cache memory 236 can be a last-level cache for the set of N sub-cores 221A-221F within the graphics processor core 219, and can also serve as shared memory that is accessible by multiple sub-cores. The geometry/fixed function pipeline 237 can be included instead of the geometry/fixed function pipeline 231 within the fixed function block 230 and can include the same or similar logic units.

In one embodiment the graphics processor core 219 includes additional fixed function logic 238 that can include various fixed function acceleration logic for use by the graphics processor core 219. In one embodiment the additional fixed function logic 238 includes an additional geometry pipeline for use in position only shading. In position-only shading, two geometry pipelines exist, the full geometry pipeline within the geometry/fixed function pipeline 238, 231, and a cull pipeline, which is an additional geometry pipeline which may be included within the additional fixed function logic 238. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 238 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 238 can also include machine-learning acceleration logic, such as fixed function matrix multiplication logic, for implementations including optimizations for machine learning training or inferencing.

Within each graphics sub-core 221A-221F includes a set of execution resources that may be used to perform graphics, media, and compute operations in response to requests by graphics pipeline, media pipeline, or shader programs. The graphics sub-cores 221A-221F include multiple EU arrays 222A-222F, 224A-224F, thread dispatch and inter-thread communication (TD/IC) logic 223A-223F, a 3D (e.g., texture) sampler 225A-225F, a media sampler 226A-226F, a shader processor 227A-227F, and shared local memory (SLM) 228A-228F. The EU arrays 222A-222F, 224A-224F each include multiple execution units, which are general-purpose graphics processing units capable of performing floating-point and integer/fixed-point logic operations in service of a graphics, media, or compute operation, including graphics, media, or compute shader programs. The TD/IC logic 223A-223F performs local thread dispatch and thread control operations for the execution units within a sub-core and facilitate communication between threads executing on the execution units of the sub-core. The 3D sampler 225A-225F can read texture or other 3D graphics related data into memory. The 3D sampler can read texture data differently based on a configured sample state and the texture format associated with a given texture. The media sampler 226A-226F can perform similar read operations based on the type and format associated with media data. In one embodiment, each graphics sub-core 221A-221F can alternately include a unified 3D and media sampler. Threads executing on the execution units within each of the sub-cores 221A-221F can make use of shared local memory 228A-228F within each sub-core, to enable threads executing within a thread group to execute using a common pool of on-chip memory.

Figure 2C:
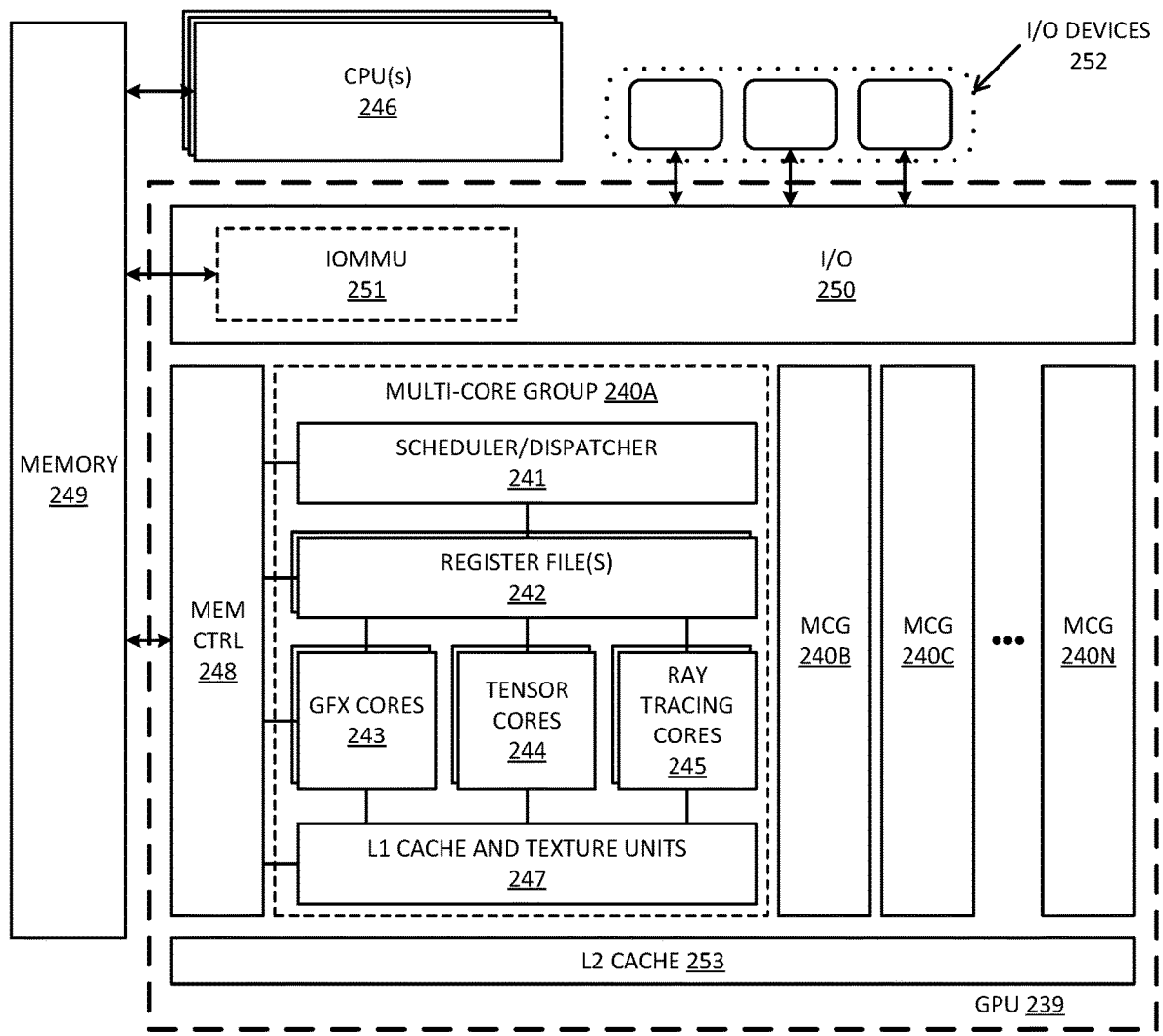

FIG. 2C illustrates a graphics processing unit (GPU) 239 that includes dedicated sets of graphics processing resources arranged into multi-core groups 240A-240N. While the details of only a single multi-core group 240A are provided, it will be appreciated that the other multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. A set of register files 242 store operand values used by the cores 243, 244, 245 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the system memory 249. In one embodiment, the IOMMU 251 manages multiple sets of page tables to map virtual addresses to physical addresses in system memory 249. In this embodiment, the I/O devices 252, CPU(s) 246, and GPU(s) 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPUs 246, GPUs 239, and I/O devices 252 are integrated on a single semiconductor chip and/or chip package. The illustrated memory 249 may be integrated on the same chip or may be coupled to the memory controllers 248 via an off-chip interface. In one implementation, the memory 249 includes GDDR6 memory which shares the same virtual address space as other physical system-level memories, although the underlying principles of the invention are not limited to this specific implementation.

In one embodiment, the tensor cores 244 include a plurality of execution units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number of matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitries for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the invention are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Figure 2D:
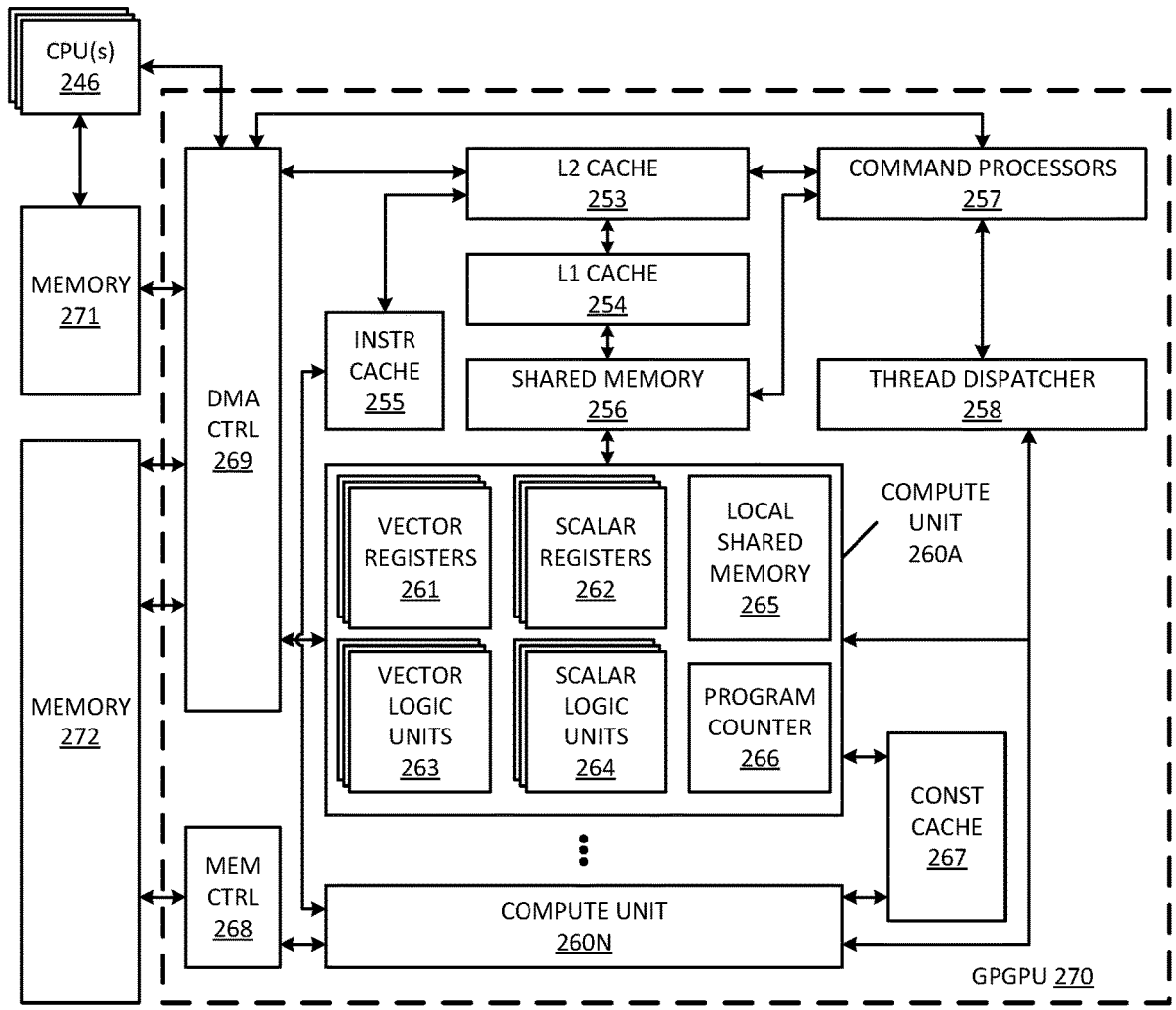

FIG. 2D is a block diagram of general purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and device memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally, each compute unit 260A-260N can be independently configured for conditional computation and can conditionally output the results of computation to memory. The command processors 257 can interrupt the one or more CPU(s) 246 when the submitted commands are complete.

Figure 3A:
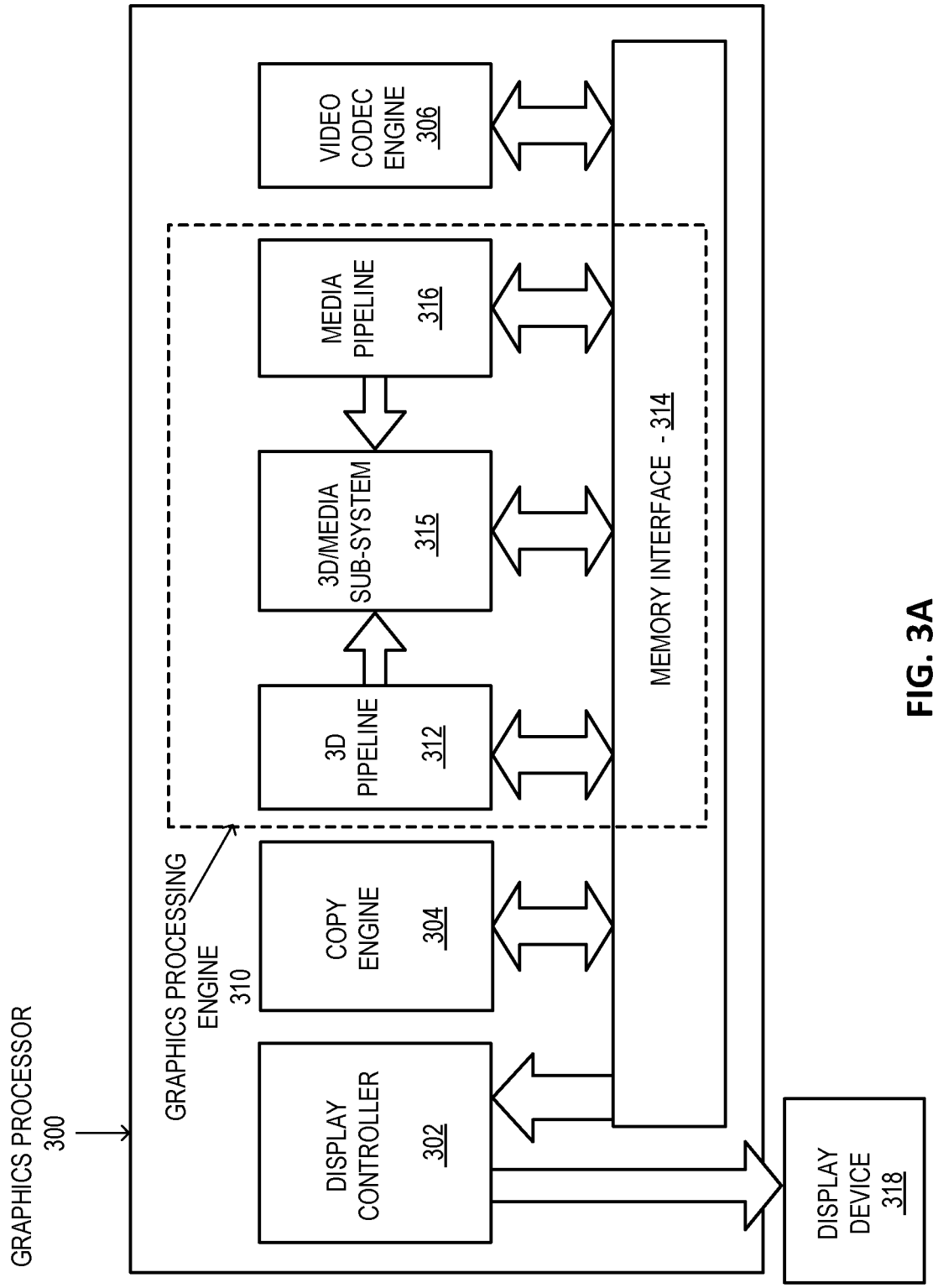
FIGS. 3A-3C illustrate block diagrams of additional graphics processor and compute accelerator architectures provided by embodiments described herein.
Figure 3B:
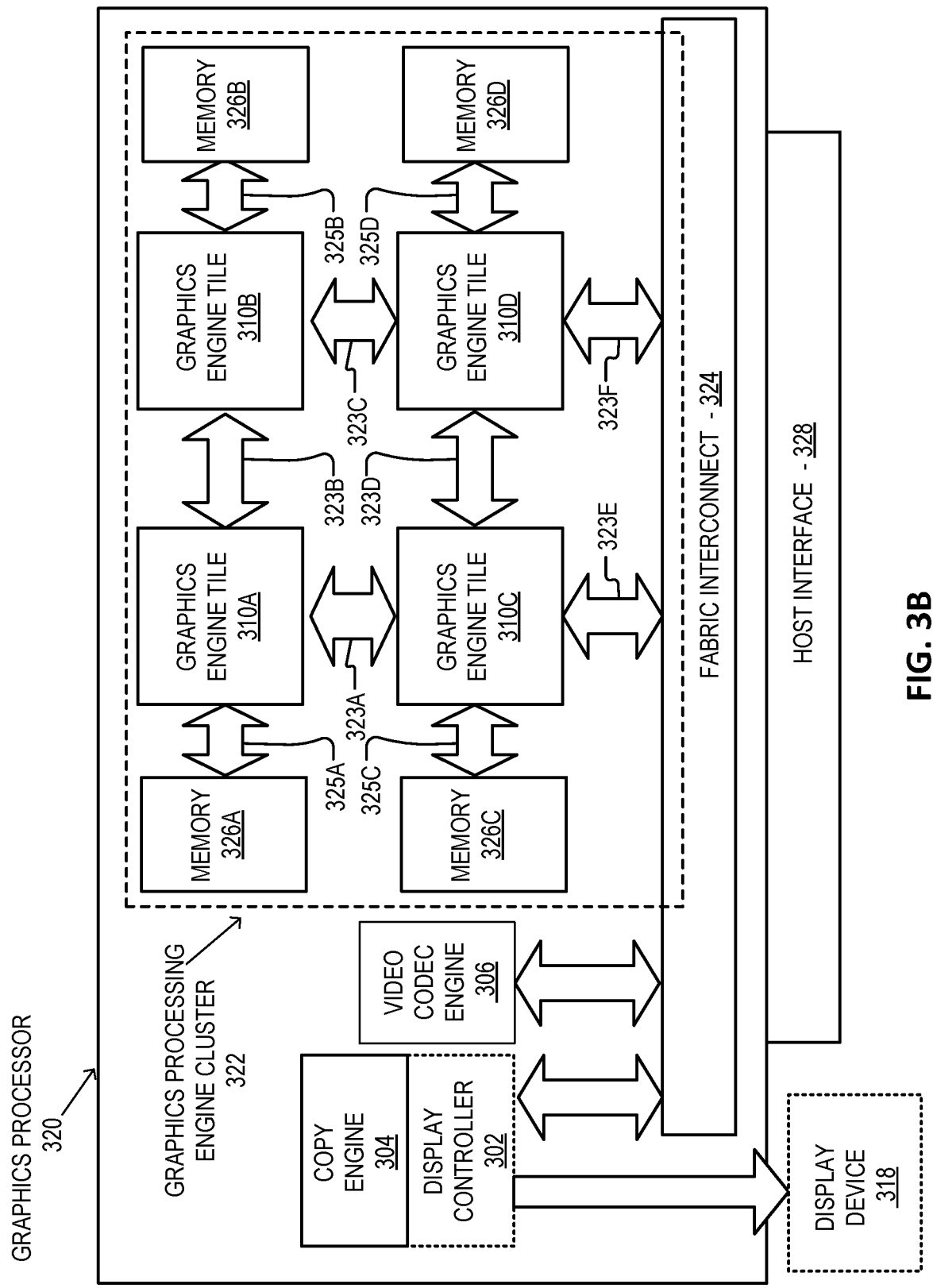
Figure 3C:
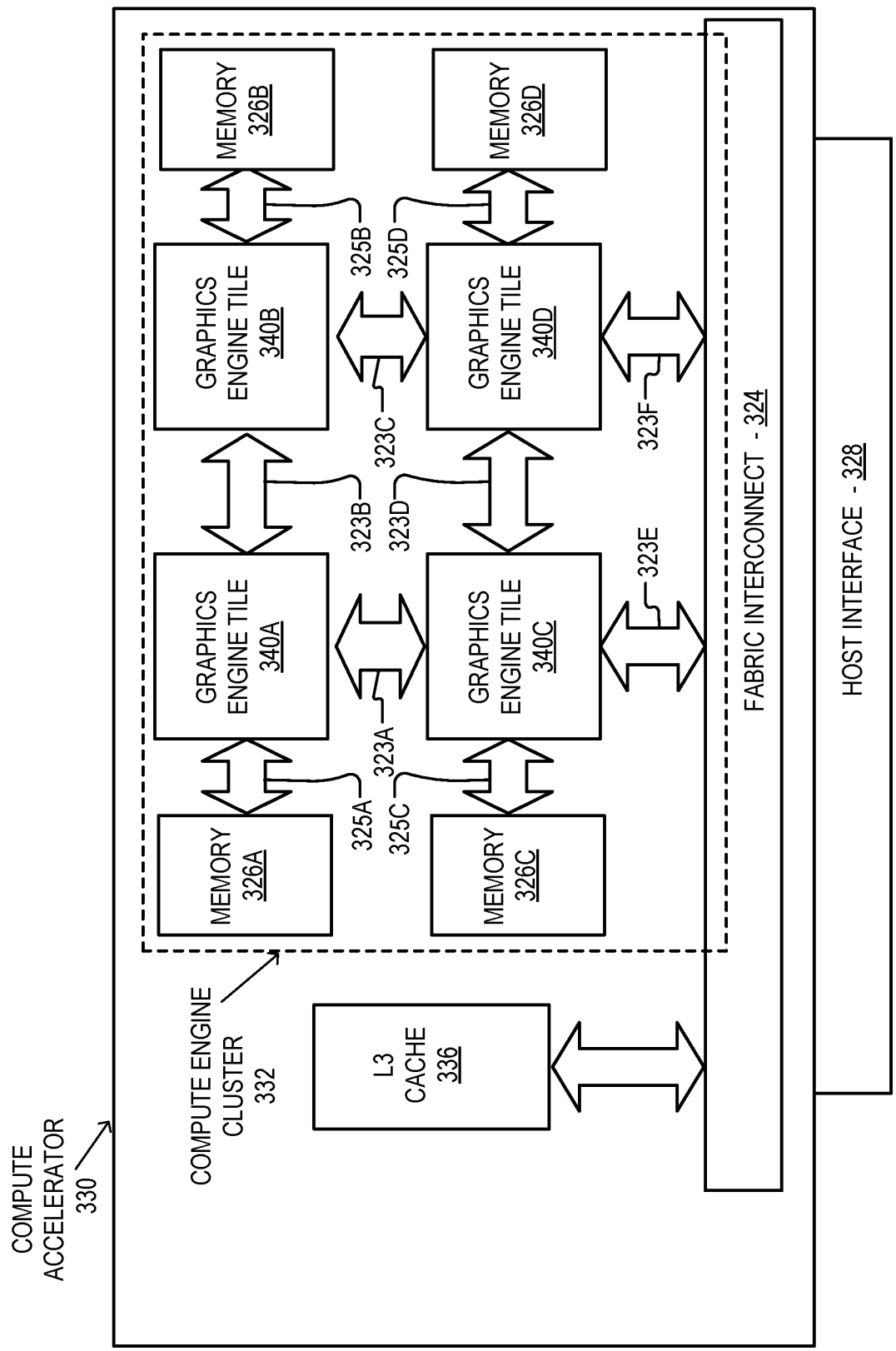

FIGS. 3A-3C illustrate block diagrams of additional graphics processor and compute accelerator architectures provided by embodiments described herein. The elements of FIGS. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are high-bandwidth memory (HBM) modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIGS. 11B-11D.

The graphics processing engine cluster 322 can connect with an on-chip or on-package fabric interconnect 324. The fabric interconnect 324 can enable communication between graphics engine tiles 310A-310D and components such as the video codec 306 and one or more copy engines 304. The copy engines 304 can be used to move data out of, into, and between the memory devices 326A-326D and memory that is external to the graphics processor 320 (e.g., system memory). The fabric interconnect 324 can also be used to interconnect the graphics engine tiles 310A-310D. The graphics processor 320 may optionally include a display controller 302 to enable a connection with an external display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320, or can be different. The graphics compute engine tiles 340A-340D can also be interconnected via a set of tile interconnects 323A-323F and may be connected with and/or interconnected by a fabric interconnect 324. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

Graphics Processing Engine

Figure 4:
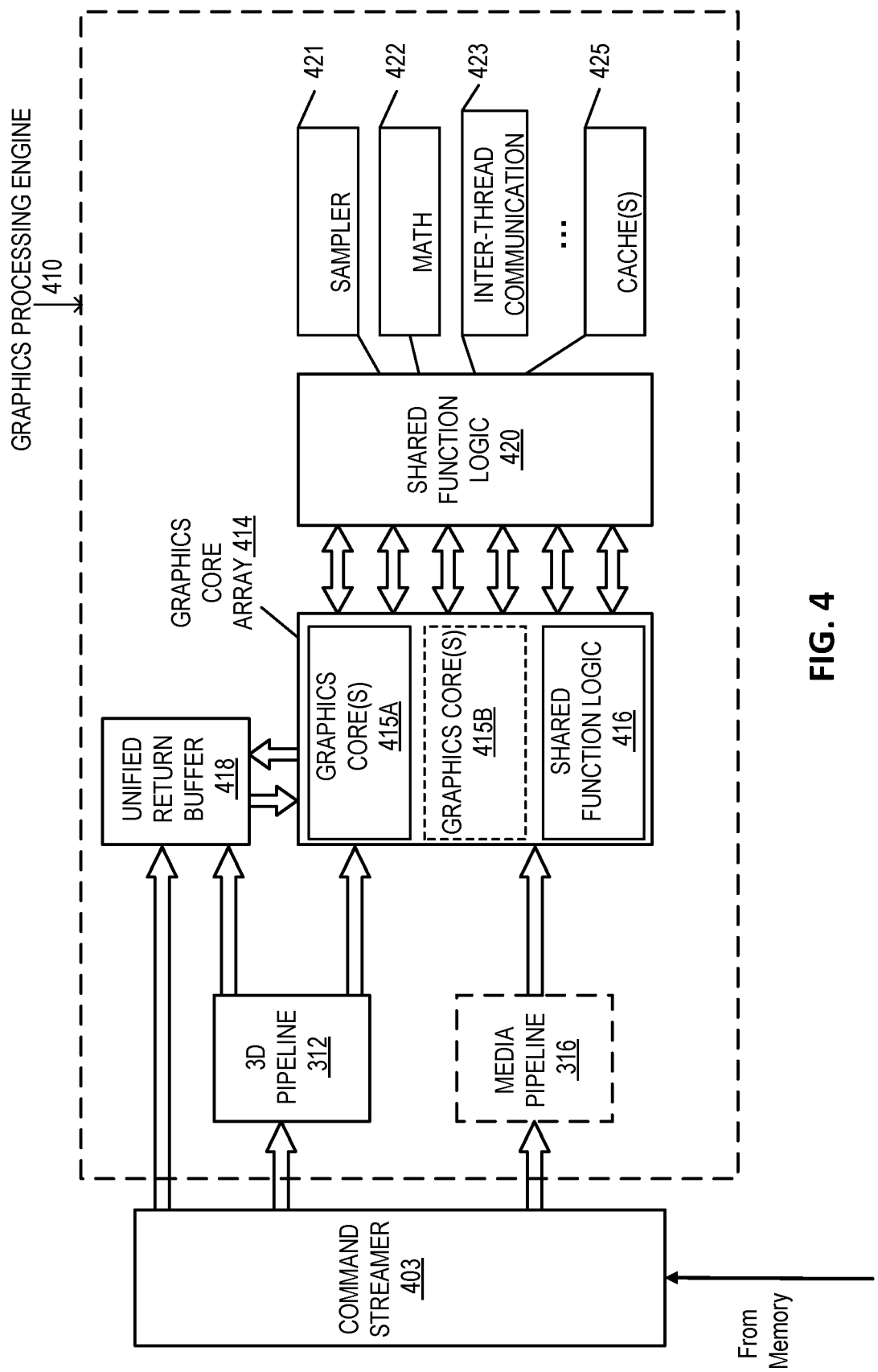
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3A, and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example, and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments, the graphics core array 414 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented at least in a case where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Execution Units

Figure 5A:
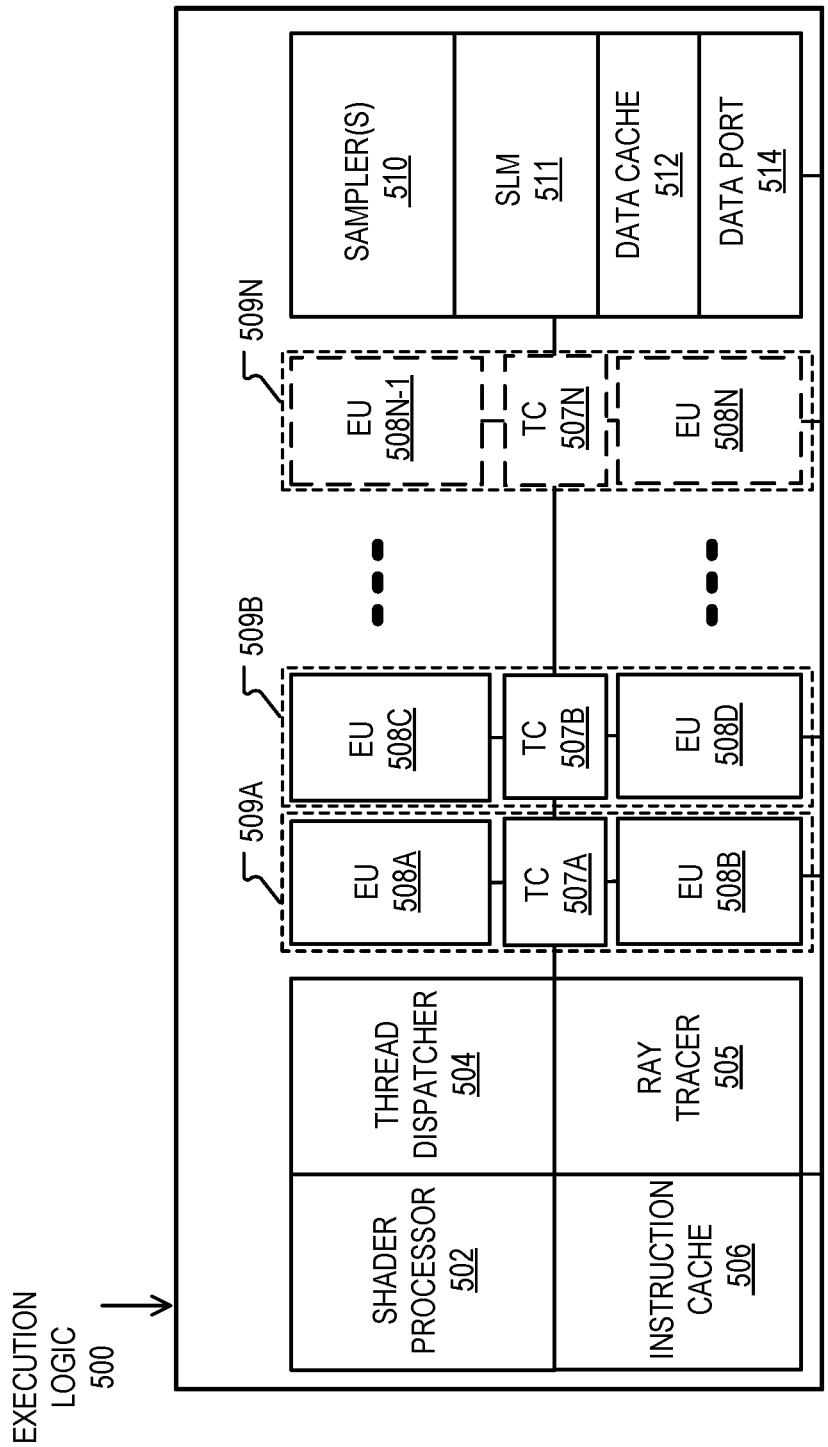
FIGS. 5A-5B illustrate thread execution logic including an array of processing elements employed in a graphics processor core according to embodiments described herein.
Figure 5B:
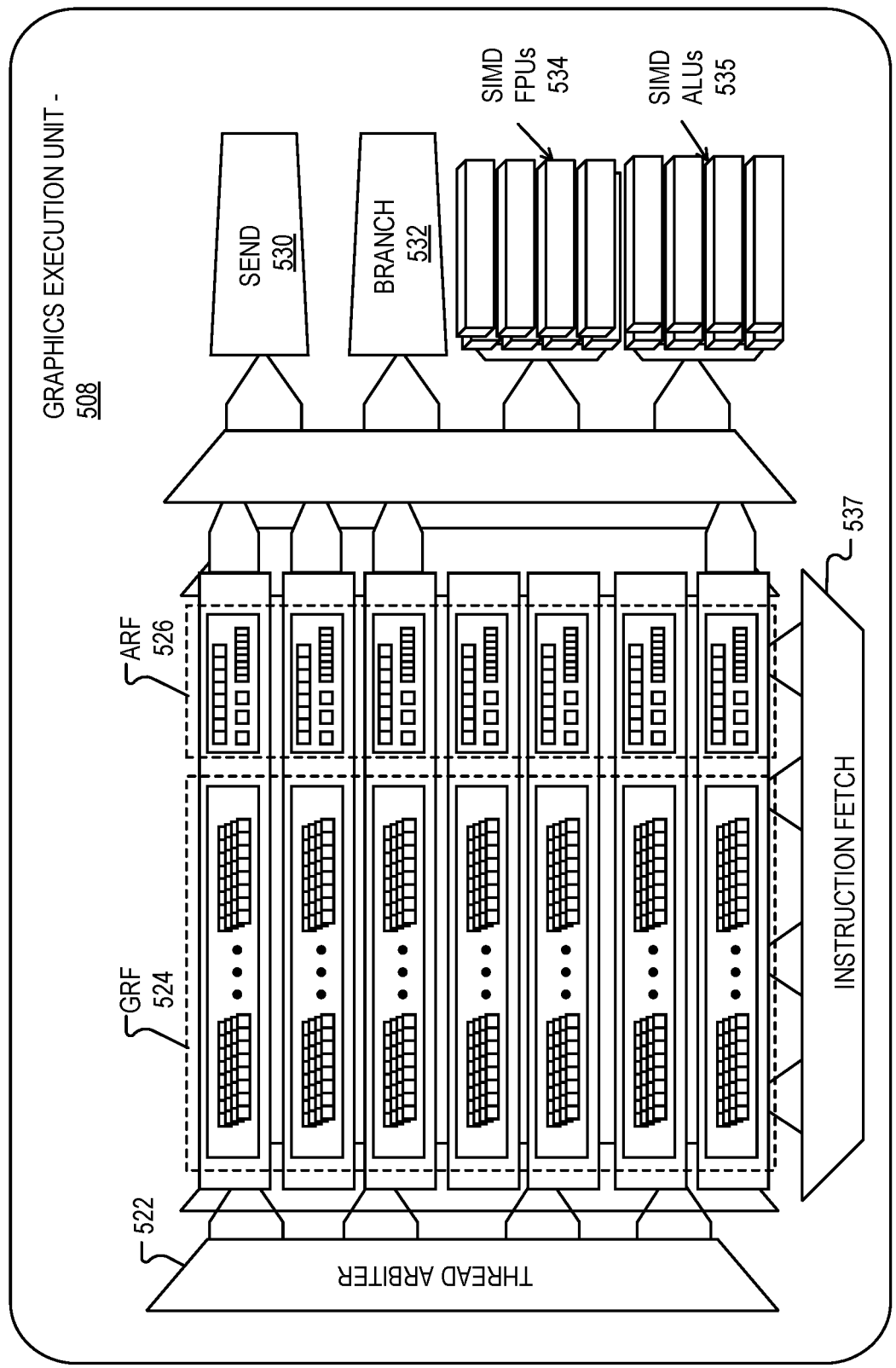

FIGS. 5A-5B illustrate thread execution logic 500 including an array of processing elements employed in a graphics processor core according to embodiments described herein. Elements of FIGS. 5A-5B having the same reference numbers (or names) as the elements of any other figure herein can operate or function in any manner similar to that described elsewhere herein, but are not limited to such. FIG. 5A-5B illustrates an overview of thread execution logic 500, which may be representative of hardware logic illustrated with each sub-core 221A-221F of FIG. 2B. FIG. 5A is representative of an execution unit within a general-purpose graphics processor, while FIG. 5B is representative of an execution unit that may be used within a compute accelerator.

As illustrated in FIG. 5A, in some embodiments thread execution logic 500 includes a shader processor 502, a thread dispatcher 504, instruction cache 506, a scalable execution unit array including a plurality of execution units 508A-508N, a sampler 510, shared local memory 511, a data cache 512, and a data port 514. In one embodiment the scalable execution unit array can dynamically scale by enabling or disabling one or more execution units (e.g., any of execution units 508A, 508B, 508C, 508D, through 508N-1 and 508N) based on the computational requirements of a workload. In one embodiment the included components are interconnected via an interconnect fabric that links to each of the components. In some embodiments, thread execution logic 500 includes one or more connections to memory, such as system memory or cache memory, through one or more of instruction cache 506, data port 514, sampler 510, and execution units 508A-508N. In some embodiments, each execution unit (e.g., 508A) is a stand-alone programmable general-purpose computational unit that is capable of executing multiple simultaneous hardware threads while processing multiple data elements in parallel for each thread. In various embodiments, the array of execution units 508A-508N is scalable to include any number individual execution units.

In some embodiments, the execution units 508A-508N are primarily used to execute shader programs. A shader processor 502 can process the various shader programs and dispatch execution threads associated with the shader programs via a thread dispatcher 504. In one embodiment the thread dispatcher includes logic to arbitrate thread initiation requests from the graphics and media pipelines and instantiate the requested threads on one or more execution unit in the execution units 508A-508N. For example, a geometry pipeline can dispatch vertex, tessellation, or geometry shaders to the thread execution logic for processing. In some embodiments, thread dispatcher 504 can also process runtime thread spawning requests from the executing shader programs.

In some embodiments, the execution units 508A-508N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 508A-508N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 508A-508N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 508A-508N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 508A-508N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 54-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 509A-509N having thread control logic (507A-507N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 509A-509N includes at least two execution units. For example, fused execution unit 509A includes a first EU 508A, second EU 508B, and thread control logic 507A that is common to the first EU 508A and the second EU 508B. The thread control logic 507A controls threads executed on the fused graphics execution unit 509A, allowing each EU within the fused execution units 509A-509N to execute using a common instruction pointer register.

One or more internal instruction caches (e.g., 506) are included in the thread execution logic 500 to cache thread instructions for the execution units. In some embodiments, one or more data caches (e.g., 512) are included to cache thread data during thread execution. Threads executing on the execution logic 500 can also store explicitly managed data in the shared local memory 511. In some embodiments, a sampler 510 is included to provide texture sampling for 3D operations and media sampling for media operations. In some embodiments, sampler 510 includes specialized texture or media sampling functionality to process texture or media data during the sampling process before providing the sampled data to an execution unit.

During execution, the graphics and media pipelines send thread initiation requests to thread execution logic 500 via thread spawning and dispatch logic. Once a group of geometric objects has been processed and rasterized into pixel data, pixel processor logic (e.g., pixel shader logic, fragment shader logic, etc.) within the shader processor 502 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 502 then executes an application programming interface (API)-supplied pixel or fragment shader program. To execute the shader program, the shader processor 502 dispatches threads to an execution unit (e.g., 508A) via thread dispatcher 504. In some embodiments, shader processor 502 uses texture sampling logic in the sampler 510 to access texture data in texture maps stored in memory. Arithmetic operations on the texture data and the input geometry data compute pixel color data for each geometric fragment, or discards one or more pixels from further processing.

In some embodiments, the data port 514 provides a memory access mechanism for the thread execution logic 500 to output processed data to memory for further processing on a graphics processor output pipeline. In some embodiments, the data port 514 includes or couples to one or more cache memories (e.g., data cache 512) to cache data for memory access via the data port.

In one embodiment, the execution logic 500 can also include a ray tracer 505 that can provide ray tracing acceleration functionality. The ray tracer 505 can support a ray tracing instruction set that includes instructions/functions for ray generation. The ray tracing instruction set can be similar to or different from the ray-tracing instruction set supported by the ray tracing cores 245 in FIG. 2C.

FIG. 5B illustrates exemplary internal details of an execution unit 508, according to embodiments. A graphics execution unit 508 can include an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of dedicated integer SIMD ALUs 535. The GRF 524 and ARF 526 includes the set of general register files and architecture register files associated with each simultaneous hardware thread that may be active in the graphics execution unit 508. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the graphics execution unit 508 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 508 is not limited to the number of hardware threads, and multiple logical threads can be assigned to each hardware thread.

In one embodiment, the graphics execution unit 508 can co-issue multiple instructions, which may each be different instructions. The thread arbiter 522 of the graphics execution unit thread 508 can dispatch the instructions to one of the send unit 530, branch unit 532, or SIMD FPU(s) 534 for execution. Each execution thread can access 128 general-purpose registers within the GRF 524, where each register can store 32 bytes, accessible as a SIMD 8-element vector of 32-bit data elements. In one embodiment, each execution unit thread has access to 4 Kbytes within the GRF 524, although embodiments are not so limited, and greater or fewer register resources may be provided in other embodiments. In one embodiment the graphics execution unit 508 is partitioned into seven hardware threads that can independently perform computational operations, although the number of threads per execution unit can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the graphics execution unit 508 includes one or more SIMD floating point units (FPU(s)) 534 to perform floating-point operations. In one embodiment, the FPU(s) 534 also support integer computation. In one embodiment the FPU(s) 534 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 54-bit floating-point. In some embodiments, a set of 8-bit integer SIMD ALUs 535 are also present, and may be specifically optimized to perform operations associated with machine learning computations.

In one embodiment, arrays of multiple instances of the graphics execution unit 508 can be instantiated in a graphics sub-core grouping (e.g., a sub-slice). For scalability, product architects can choose the exact number of execution units per sub-core grouping. In one embodiment the execution unit 508 can execute instructions across a plurality of execution channels. In a further embodiment, each thread executed on the graphics execution unit 508 is executed on a different channel.

Figure 6:
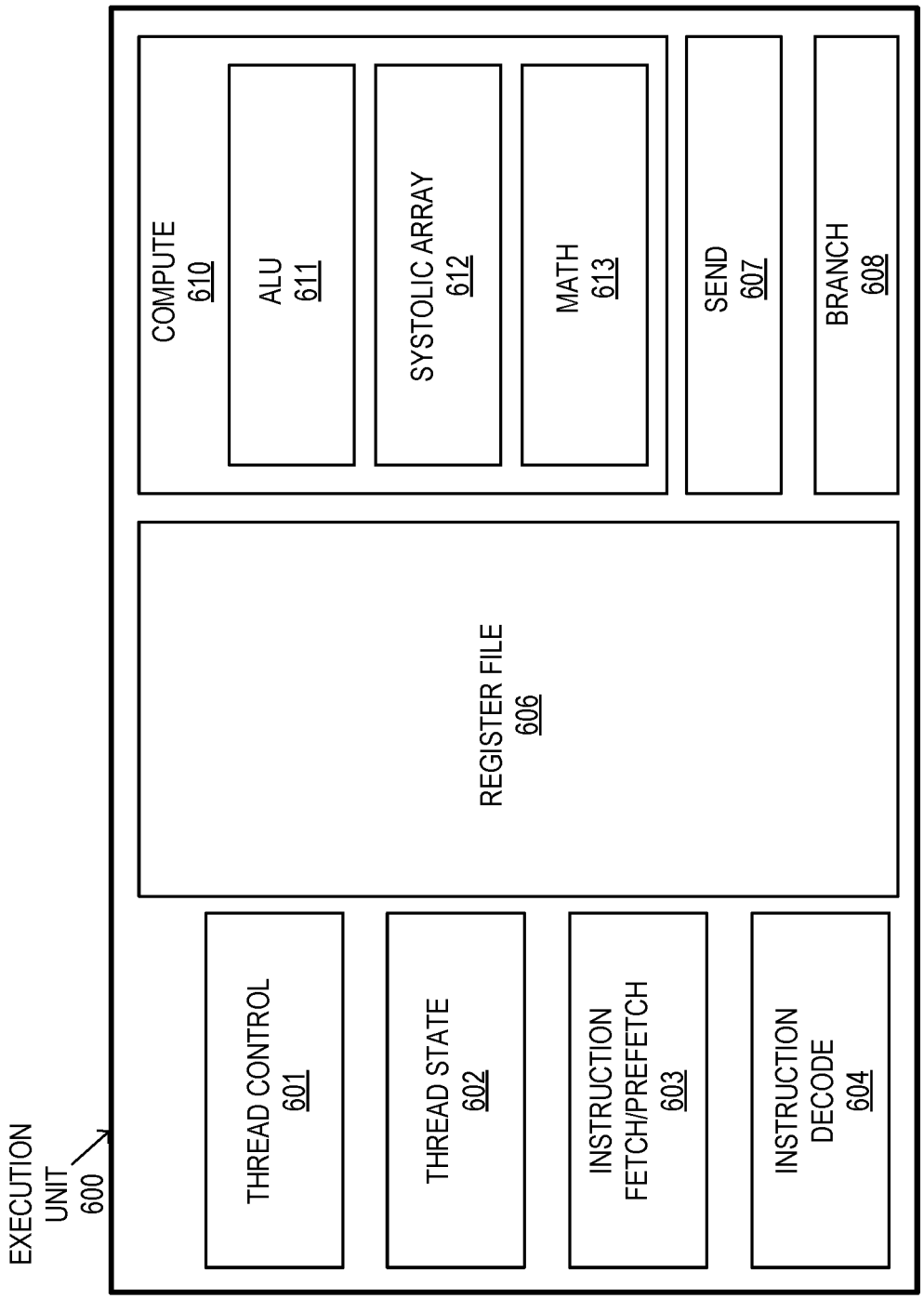
FIG. 6 illustrates an additional execution unit, according to an embodiment.

FIG. 6 illustrates an additional execution unit 600, according to an embodiment. The execution unit 600 may be a compute-optimized execution unit for use in, for example, a compute engine tile 340A-340D as in FIG. 3C, but is not limited as such. Variants of the execution unit 600 may also be used in a graphics engine tile 310A-310D as in FIG. 3B. In one embodiment, the execution unit 600 includes a thread control unit 601, a thread state unit 602, an instruction fetch/prefetch unit 603, and an instruction decode unit 604. The execution unit 600 additionally includes a register file 606 that stores registers that can be assigned to hardware threads within the execution unit. The execution unit 600 additionally includes a send unit 607 and a branch unit 608. In one embodiment, the send unit 607 and branch unit 608 can operate similarly as the send unit 530 and a branch unit 532 of the graphics execution unit 508 of FIG. 5B.

The execution unit 600 also includes a compute unit 610 that includes multiple different types of functional units. In one embodiment the compute unit 610 includes an ALU unit 611 that includes an array of arithmetic logic units. The ALU unit 611 can be configured to perform 64-bit, 32-bit, and 16-bit integer and floating point operations. Integer and floating point operations may be performed simultaneously. The compute unit 610 can also include a systolic array 612, and a math unit 613. The systolic array 612 includes a W wide and D deep network of data processing units that can be used to perform vector or other data-parallel operations in a systolic manner. In one embodiment the systolic array 612 can be configured to perform matrix operations, such as matrix dot product operations. In one embodiment the systolic array 612 support 16-bit floating point operations, as well as 8-bit and 4-bit integer operations. In one embodiment the systolic array 612 can be configured to accelerate machine learning operations. In such embodiments, the systolic array 612 can be configured with support for the bfloat 16-bit floating point format. In one embodiment, a math unit 613 can be included to perform a specific subset of mathematical operations in an efficient and lower-power manner than then ALU unit 611. The math unit 613 can include a variant of math logic that may be found in shared function logic of a graphics processing engine provided by other embodiments (e.g., math logic 422 of the shared function logic 420 of FIG. 4). In one embodiment the math unit 613 can be configured to perform 32-bit and 64-bit floating point operations.

The thread control unit 601 includes logic to control the execution of threads within the execution unit. The thread control unit 601 can include thread arbitration logic to start, stop, and preempt execution of threads within the execution unit 600. The thread state unit 602 can be used to store thread state for threads assigned to execute on the execution unit 600. Storing the thread state within the execution unit 600 enables the rapid pre-emption of threads when those threads become blocked or idle. The instruction fetch/prefetch unit 603 can fetch instructions from an instruction cache of higher level execution logic (e.g., instruction cache 506 as in FIG. 5A). The instruction fetch/prefetch unit 603 can also issue prefetch requests for instructions to be loaded into the instruction cache based on an analysis of currently executing threads. The instruction decode unit 604 can be used to decode instructions to be executed by the compute units. In one embodiment, the instruction decode unit 604 can be used as a secondary decoder to decode complex instructions into constituent micro-operations.

The execution unit 600 additionally includes a register file 606 that can be used by hardware threads executing on the execution unit 600. Registers in the register file 606 can be divided across the logic used to execute multiple simultaneous threads within the compute unit 610 of the execution unit 600. The number of logical threads that may be executed by the graphics execution unit 600 is not limited to the number of hardware threads, and multiple logical threads can be assigned to each hardware thread. The size of the register file 606 can vary across embodiments based on the number of supported hardware threads. In one embodiment, register renaming may be used to dynamically allocate registers to hardware threads.

Figure 7:
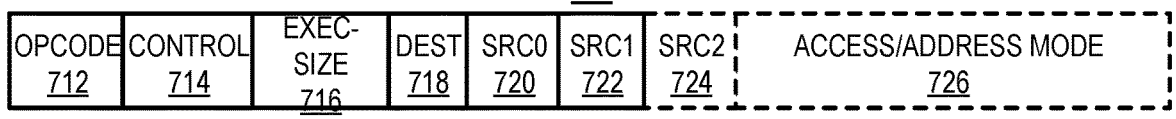
FIG. 7 is a block diagram illustrating a graphics processor instruction formats according to some embodiments.
Figure 7:
Figure 7:
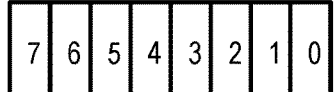
Figure 7:
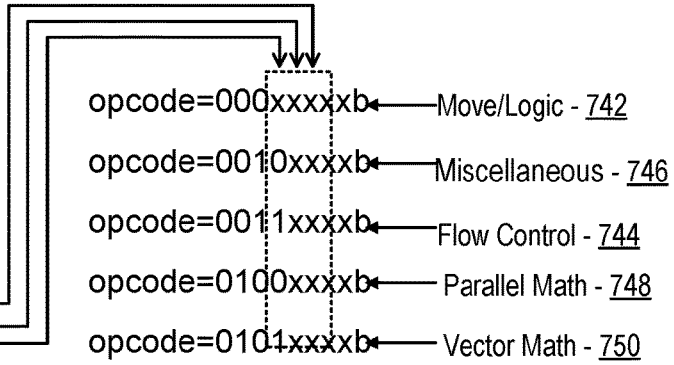

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
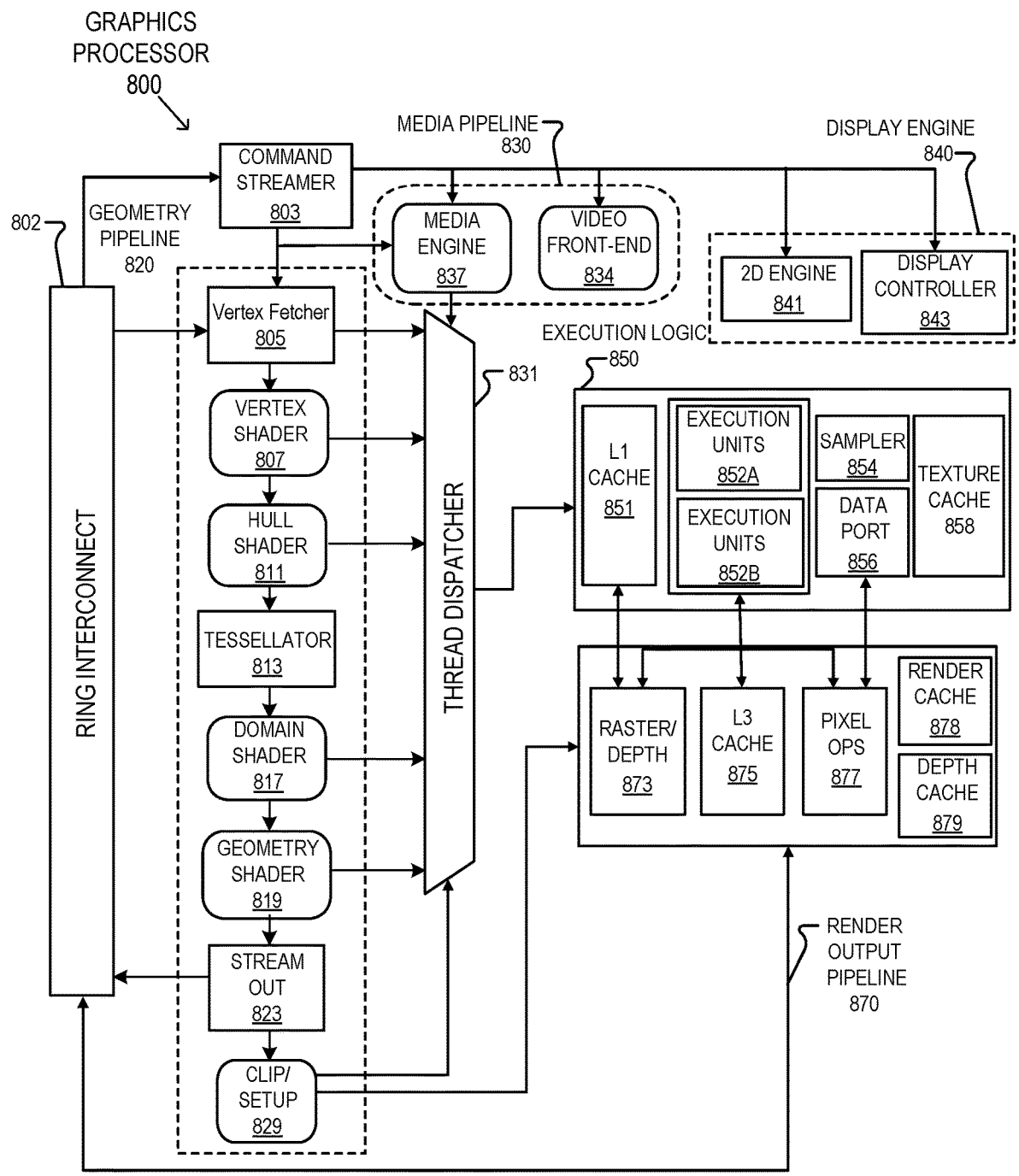
FIG. 8 is a block diagram of another embodiment of a graphics processor.

FIG. 8 is a block diagram of another embodiment of a graphics processor 800.

Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled, the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g., bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces (API) and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
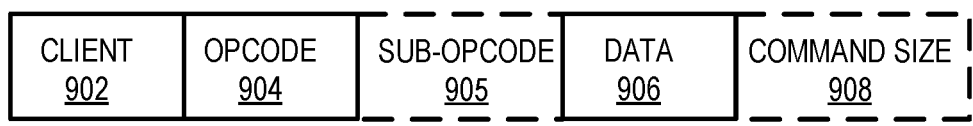
FIG. 9A is a block diagram illustrating a graphics processor command format according to some embodiments.
Figure 9B:
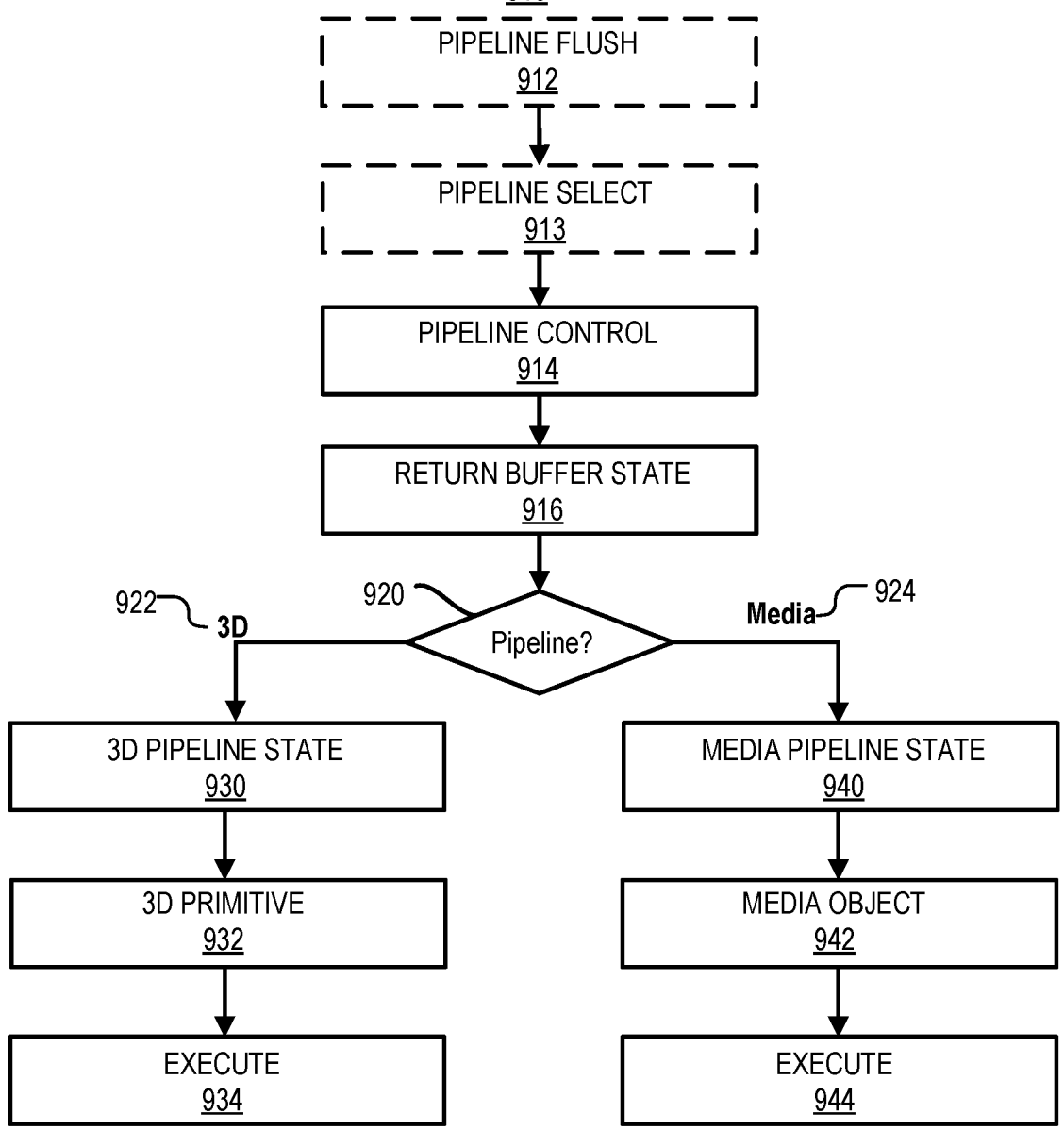
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word. Other command formats can be used.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
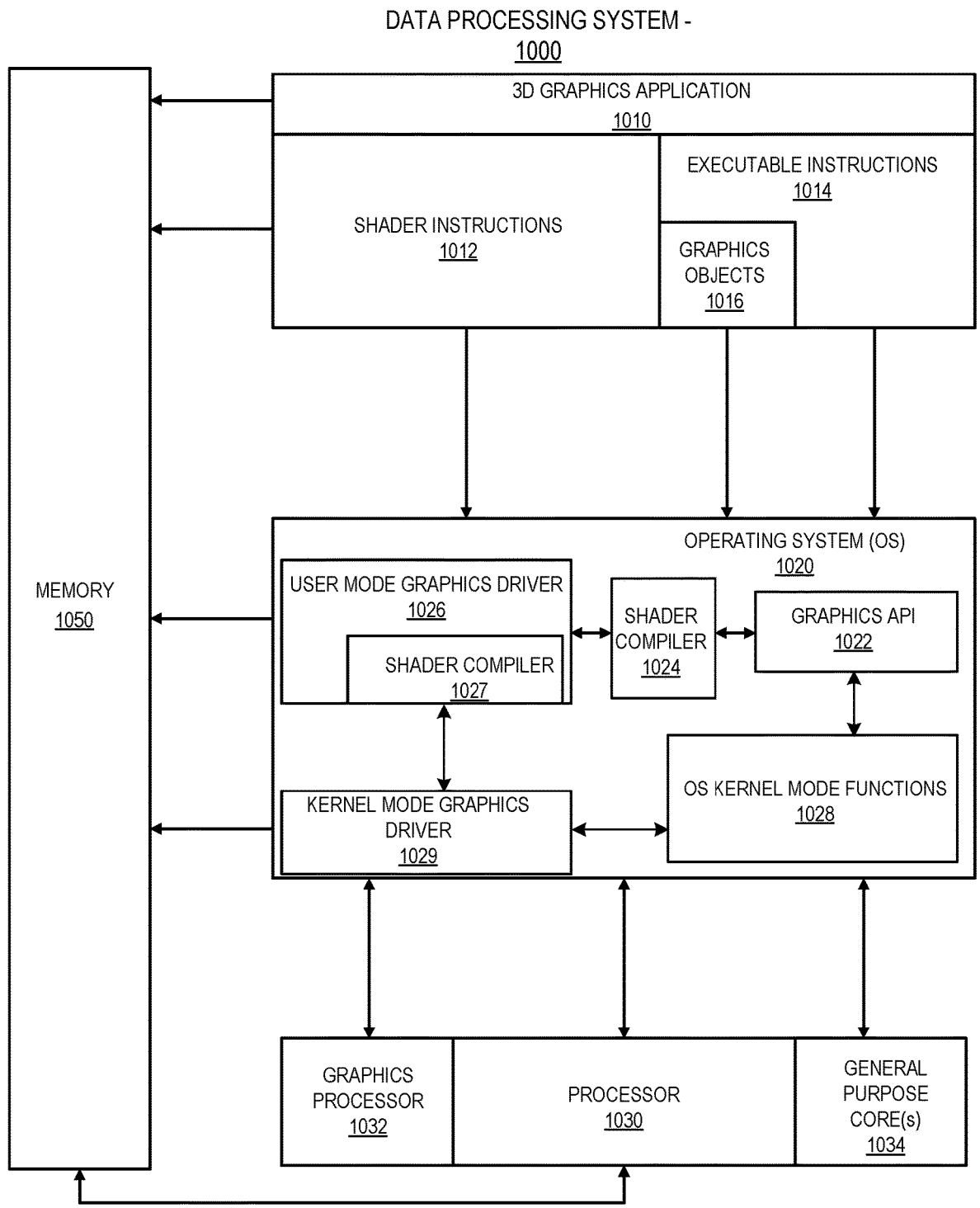
FIG. 10 illustrates an exemplary graphics software architecture for a data processing system according to some embodiments.

FIG. 10 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
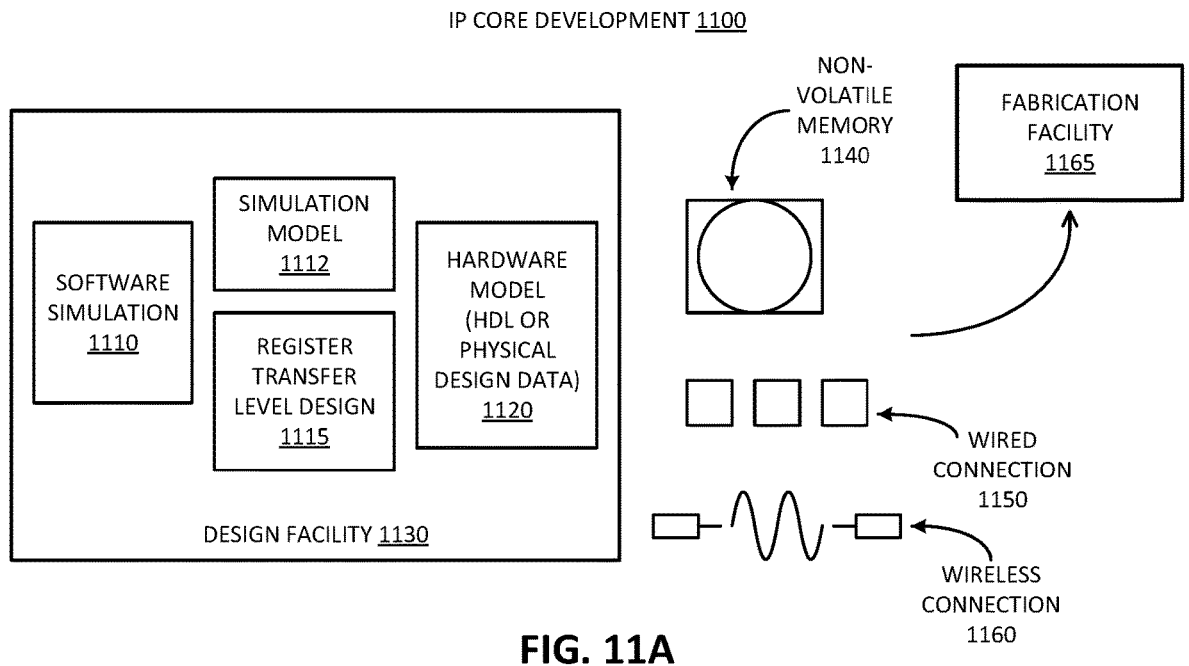
FIG. 11A is a block diagram illustrating an IP core development system that may be used to manufacture an integrated circuit to perform operations according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
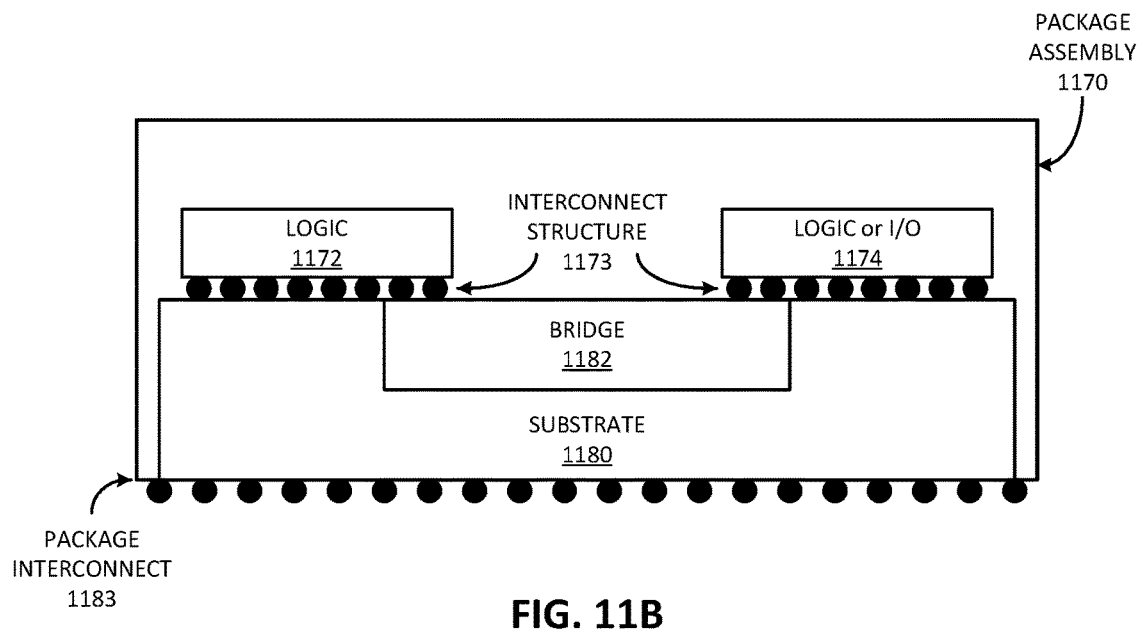
FIG. 11B illustrates a cross-section side view of an integrated circuit package assembly, according to some embodiments described herein.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 11C:
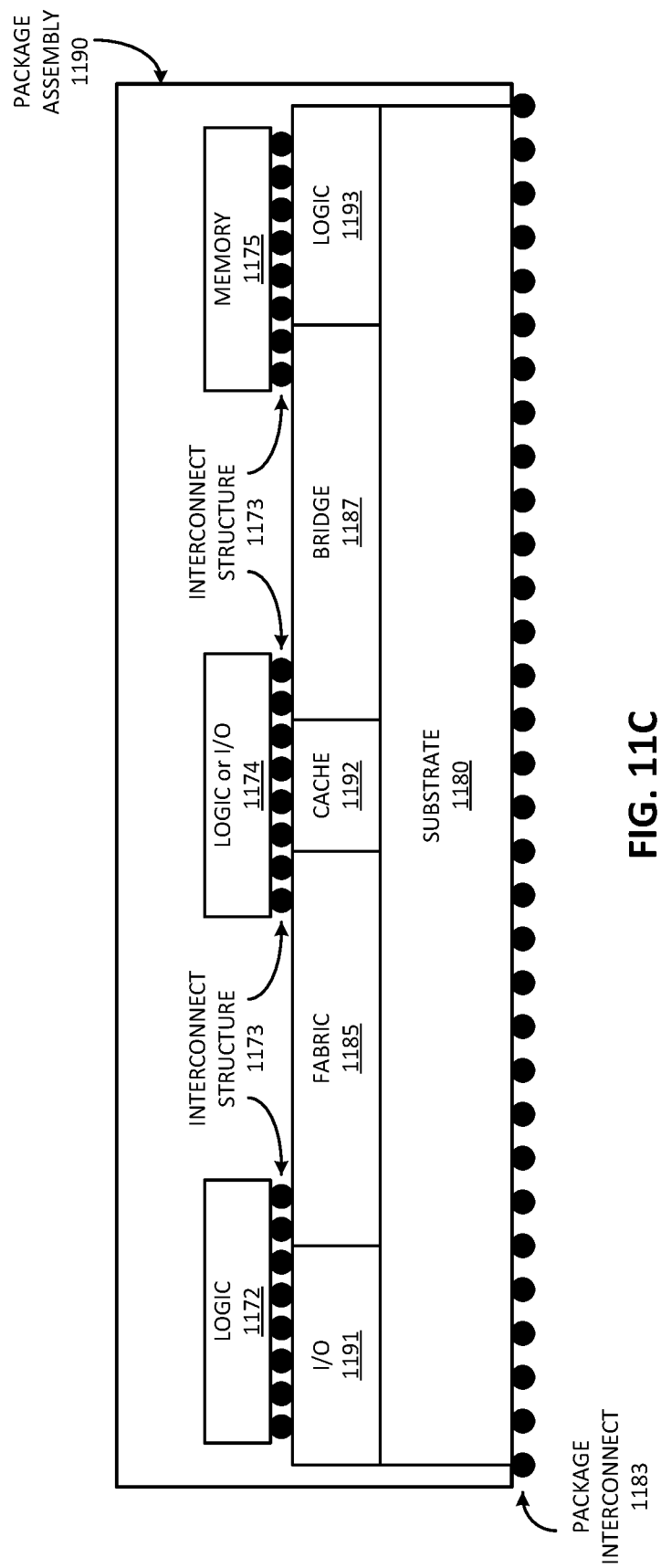
FIG. 11C illustrates a package assembly that includes multiple units of hardware logic chiplets connected to a substrate.

FIG. 11C illustrates a package assembly 1190 that includes multiple units of hardware logic chiplets connected to a substrate 1180 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, HBM) memory or cache (SRAM) memory.

Each chiplet can be fabricated as separate semiconductor die and coupled with the substrate 1180 via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (I/O) signals and/or power or ground signals associated with the operation of the logic, I/O and memory chiplets.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

The substrate 1180 can include hardware components for I/O 1191, cache memory 1192, and other hardware logic 1193. A fabric 1185 can be embedded in the substrate 1180 to enable communication between the various logic chiplets and the logic 1191, 1193 within the substrate 1180. In one embodiment, the I/O 1191, fabric 1185, cache, bridge, and other hardware logic 1193 can be integrated into a base die that is layered on top of the substrate 1180.

In various embodiments a package assembly 1190 can include fewer or greater number of components and chiplets that are interconnected by a fabric 1185 or one or more bridges 1187. The chiplets within the package assembly 1190 may be arranged in a 3D or 2.5D arrangement. In general, bridge structures 1187 may be used to facilitate a point to point interconnect between, for example, logic or I/O chiplets and memory chiplets. The fabric 1185 can be used to interconnect the various logic and/or I/O chiplets (e.g., chiplets 1172, 1174, 1191, 1193). with other logic and/or I/O chiplets. In one embodiment, the cache memory 1192 within the substrate can act as a global cache for the package assembly 1190, part of a distributed global cache, or as a dedicated cache for the fabric 1185.

Figure 11D:
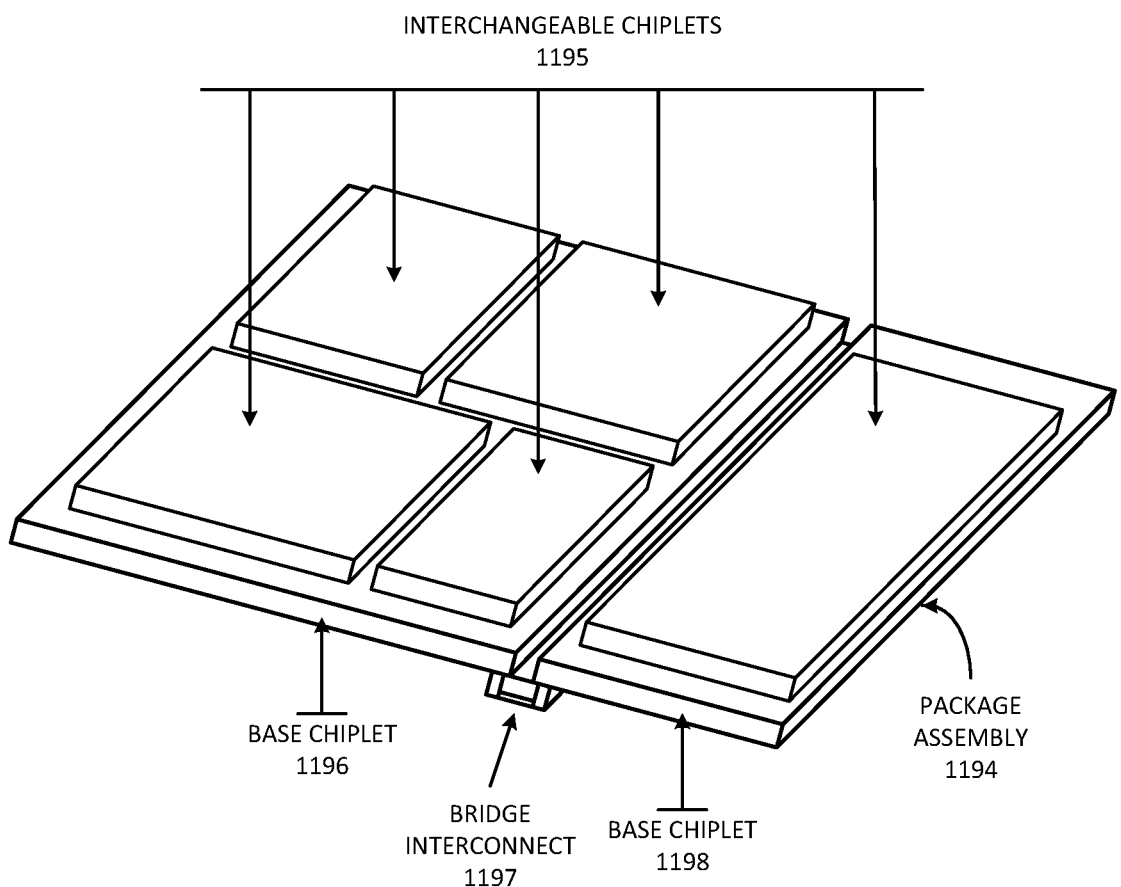
FIG. 11D illustrates a package assembly including interchangeable chiplets, according to an embodiment.

FIG. 11D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 12:
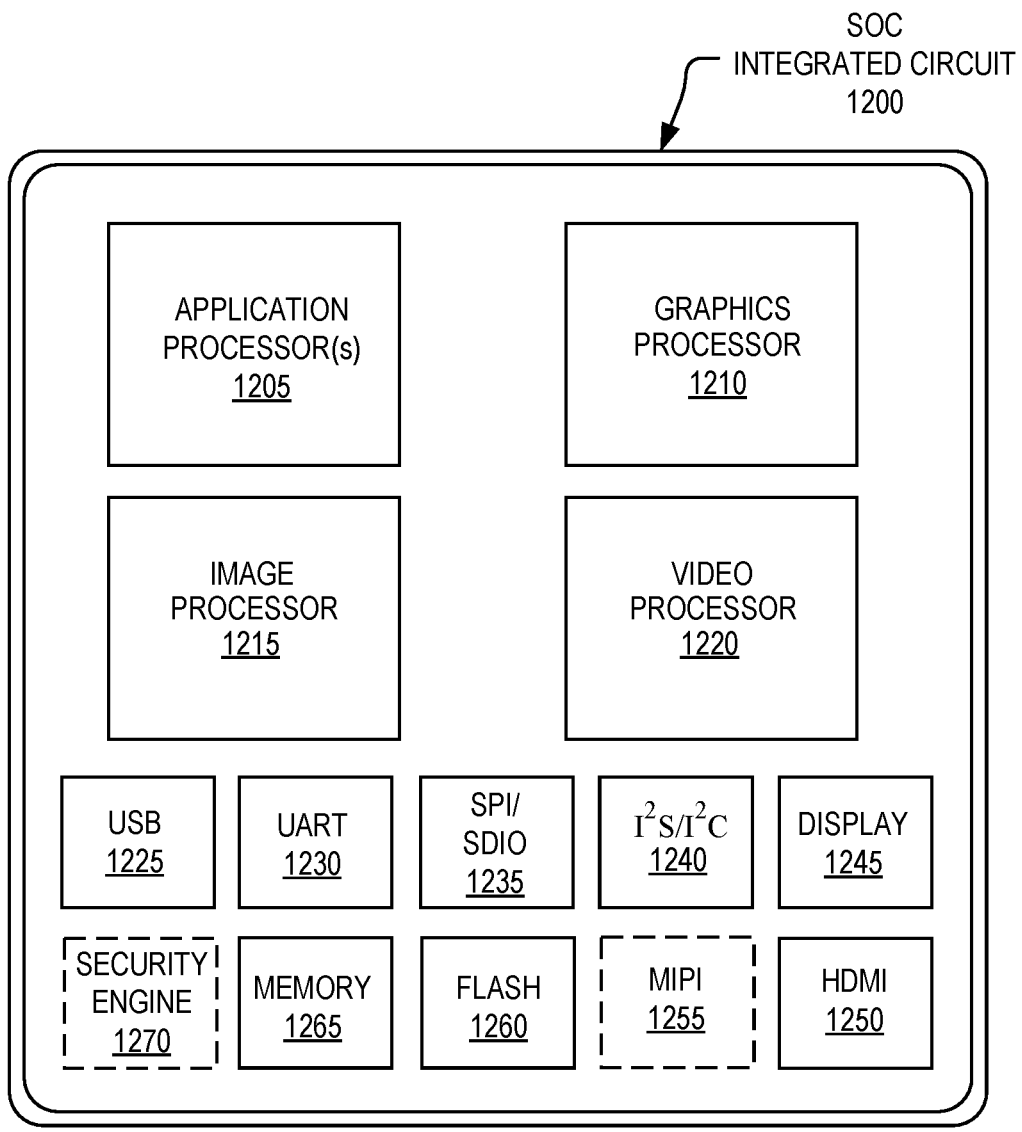
FIGS. 12, 13A and 13B illustrate exemplary integrated circuits and associated graphics processors that may be fabricated using one or more IP cores, according to various embodiments described herein.
Figure 13A:
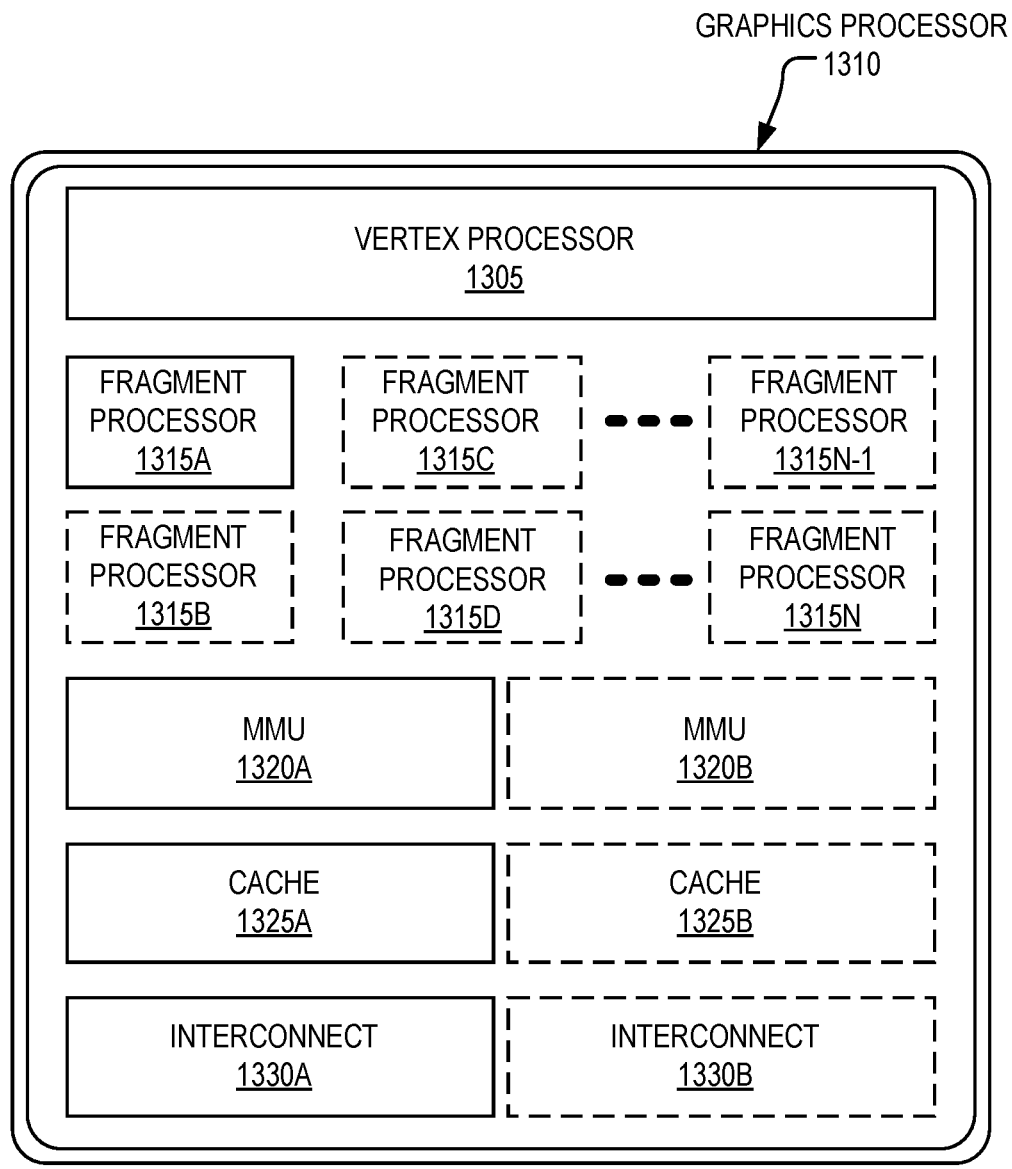
Figure 13B:
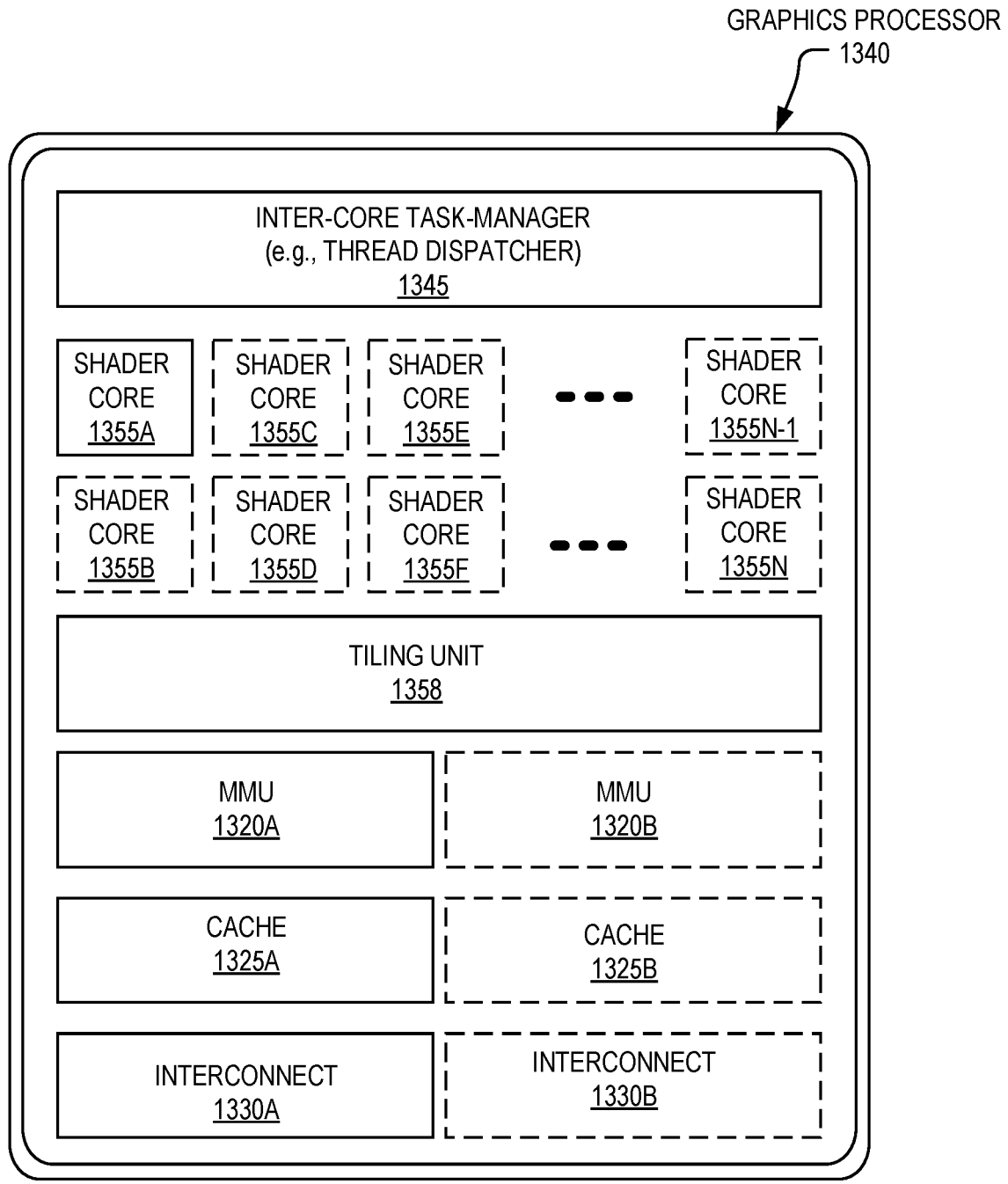

FIGS. 12 and 13A-13B illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1355A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14:
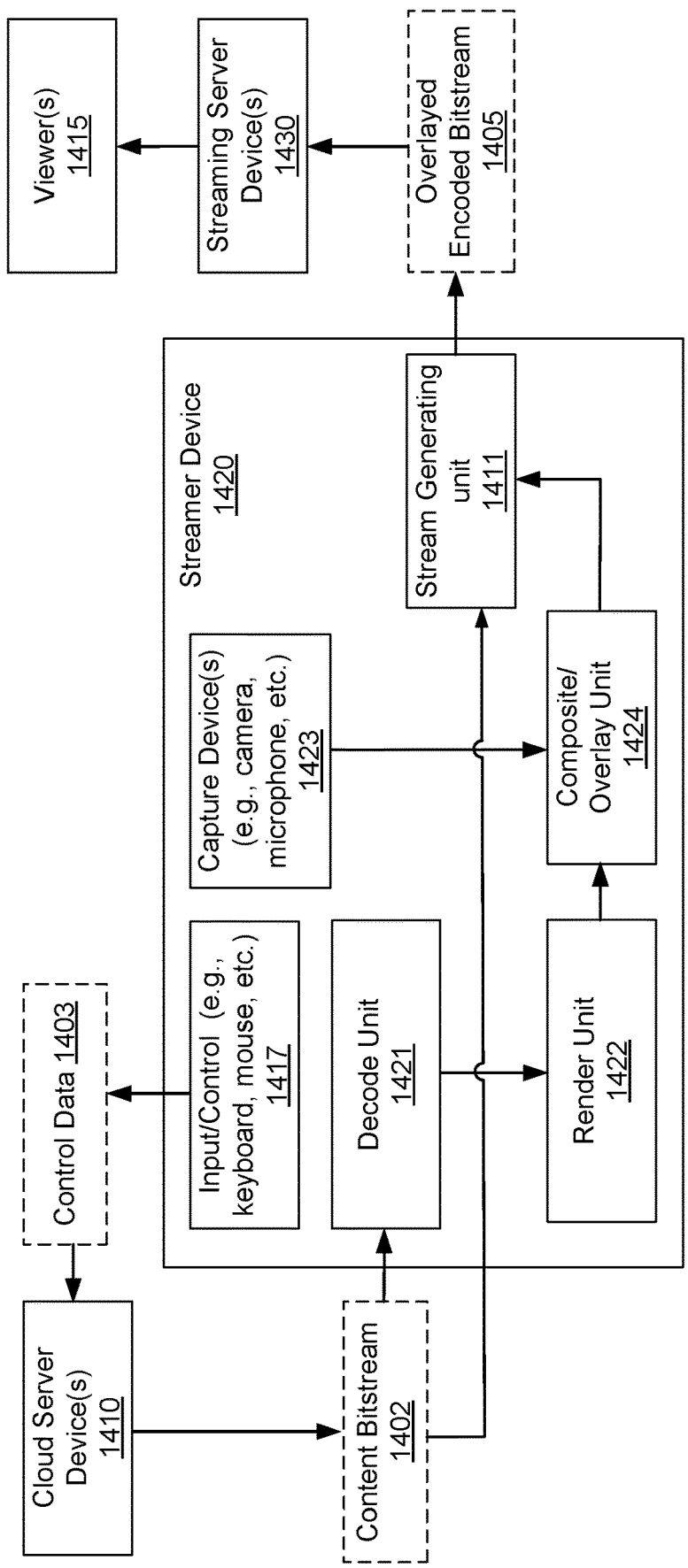
FIG. 14 is a block diagram of an example of a system for video streaming for cloud gaming.

FIG. 14 is a block diagram of an example of a system for video streaming for cloud gaming.

The system illustrated in FIG. 14 includes one or more cloud server devices 1410 (also referred to herein as a host server device), a streamer device 1420 (also referred to herein as a client device), and a streaming server device 1430, each communicably coupled via a network. Each of cloud server device 1410, streamer device 1420, and/or streaming server device 1430 may be a single processor desktop system, a multiprocessor workstation system, or a server system having a large number of processors or processor cores. In one example, one or more of cloud server device 1410, streamer device 1420, and/or streaming server device 1430 is a processing platform incorporated within a system-on-a-chip (SoC) integrated circuit for use in mobile, handheld, or embedded devices such as within Internet-of-things (IoT) devices with wired or wireless connectivity to a local or wide area network. In one example, one or more of cloud server device 1410, streamer device 1420, and/or streaming server device 1430 may include a GPGPU or GPU, such as the example GPGPUs and/or GPUs described herein with respect to FIGS. 1-13.

One or more of cloud server device 1410, streamer device 1420, and/or streaming server device 1430 may include any number and type of video, image, or graphics processing units that may provide the operations as discussed herein. Such operations may be implemented via software or hardware or a combination thereof. As illustrated, streamer device 1420 may include a decode unit 1421, a render unit 1422, input/output control devices (e.g., keyboard, mouse, gamepad, touchpad, etc.) 1417, a capture device 1423 (e.g., camera, microphone, etc.), a composite/overlay unit 1424, and a stream generator 1411.

In one example, one or more or portions of at least the decode unit 1421, the render unit 1422, the capture device 1423, the composite/overlay unit 1424, and the stream generating unit 1411 are implemented via a processing resource, such as an execution unit (EU). The processing resource, such as the EU, may include, for example, programmable logic or circuitry such as a logic core or cores that may provide a wide array of programmable logic functions. In one example, one or more or portions of the decode unit 1421, the render unit 1422, the capture device 1423, the composite/overlay unit 1424, and the stream generating unit 1411 are implemented via dedicated hardware such as fixed function circuitry or the like including MACs to execute a neural network. Fixed function circuitry may include dedicated logic or circuitry and may provide a set of fixed function entry points that may map to the dedicated logic for a fixed purpose or function.

In one example, the cloud server device 1410 may operate as a game cloud device hosting one or more gaming bitstreams provided as output (e.g., content bitstream 1402) to streamer devices, such as streamer device 1420. In one example, the content bitstream includes frames captured from the game. The decode unit 1421 receives the content bitstream 1402. The render unit 1422 renders the content bitstream 1402. The composite-overlay unit 1424 provides for compositing and/or overlaying of a captured overlay bitstream on the rendered content bitstream. For example, the captured overlay bitstream may include video (e.g., from a camera), audio (e.g., voice from a microphone or other audio), text (chat), images (e.g., avatars, stickers, emojis, graphics, etc.). In one example, the video portion of the captured overlay bitstream 1405 may represent a bitstream generated with assistance of video encode (e.g., it can be part of the streamer device and/or integrated in the capture device (e.g., the camera, etc.)). Compositing or overlaying the overlay data involves, for example, combining the overlay data with the frames from the game. Thus, a user (e.g., gamer) can view the content bitstream (e.g., game frames), and produce control data 1403 in response to viewing the game frames of the content bitstream 1402. The user may generate overlay data to be overlayed over the game frames by, for example, recording video, recording audio, typing text, or providing or selecting some other content (e.g., avatars, graphics, etc.). In one example, the user views the game frames with some or all of the overlayed data.

In addition to receiving the game frames (e.g., as a part of playing a game), the streamer device may also send the game frames with overlayed data to one or more viewers. A viewer is a device that receives a stream for viewing without participation in the generation of the stream (e.g., without playing the game). Thus, a viewer device does not provide control information to the cloud server to change or cause manipulations in game or other application producing the content bitstream 1402. In one example, the stream generating unit 1411 generates and sends an overlayed and encoded bitstream 1405 to a streaming server device 1430, which then sends the overlayed encoded bitstream to one or more viewers 1415. In one example, the streaming server 1430 is a streaming cloud server that streams content for viewing to one or more users.

Thus, in FIG. 14, the streamer device 1420 receives the content bitstream 1402 (e.g., display and audio), combines or mixes the content bitstream 1402 with overlay content, and sends the overlayed bitstream 1405 to a streaming server device 1430 for viewing by viewers 1415. Streaming to viewers from the end-user device fails to take advantage of video compression optimization techniques available in the cloud. Also, streaming to viewers from the end-user device fails to consider that different types of participants typically have different quality of service (QoS) requirements, such as latency. For example, one type of participant is a content manager or streamer. A content manager or streamer is a user that organizes a stream such as a game player, conference presenter, or other content streamer. Another type of participant is a viewer, which is a user that receives a stream for viewing (e.g., watches a stream). Content managers/streamers are typically interested in reducing the latency of remote execution (e.g., the delay between end-user device and cloud) and minimizing frames/packets dropping, especially for cloud gaming. For viewers, the latency requirements are typically lower. For example, for viewers, the latency may reach several seconds without impact to interactivity.

In contrast to existing solutions, a cloud server device receives overlay data from the streamer, combines the overlay data with the display capture frames (e.g., game frames), and sends the combined display capture and overlay data to a viewer or streaming service. In one example, the cloud server device gathers statistics about the streamer's channel and encodes the display capture frames at a rate determined using the statistics. Thus, recognizing that the viewers may have more relaxed QoS requirements and may tolerate more delay than the streamer, the cloud server device can buffer frames and encode the frames using compression parameters based on the statistics.

Figure 15A:
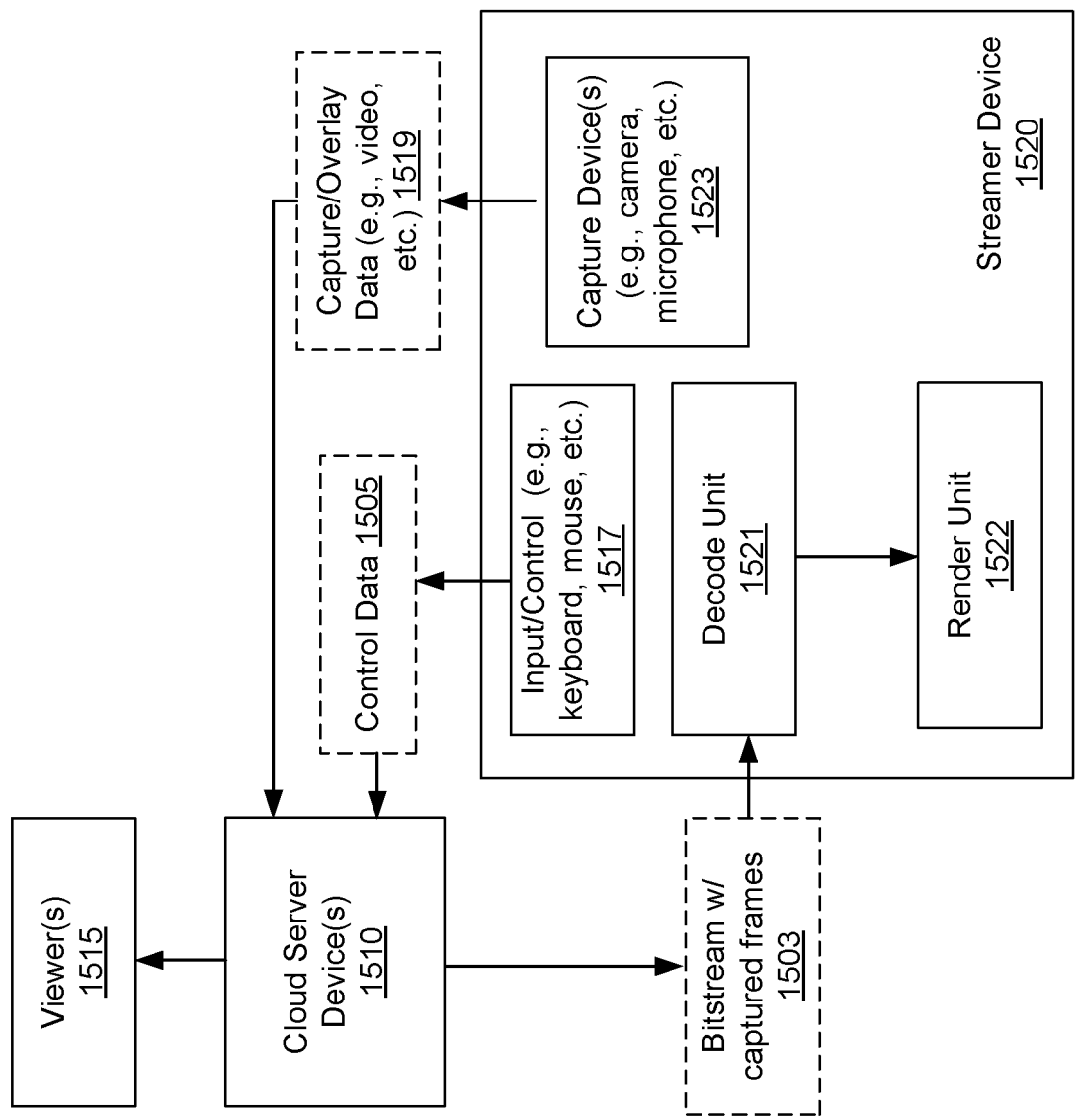
FIG. 15A is a block diagram of an example of a system for video streaming for applications and workloads executed in cloud.

FIG. 15A is a block diagram of an example of a system for video streaming for applications and workloads executed in cloud. Like in FIG. 14, the system illustrated in FIG. 15A includes one or more cloud server devices 1510 (also referred to herein as a host server device or server device), and a streamer device 1520 (also referred to herein as a client device). The cloud server device 1510 and the streamer device 1520 are communicably coupled via a network. Each of cloud server device 1510 and the streamer device 1520 may be a single processor desktop system, a multiprocessor workstation system, or a server system having a large number of processors or processor cores. In one example, one or more of cloud server device 1510 and the streamer device 1520 is a processing platform incorporated within a system-on-a-chip (SoC) integrated circuit for use in mobile, handheld, or embedded devices such as within Internet-of-things (IoT) devices with wired or wireless connectivity to a local or wide area network. In one example, one or more of cloud server device 1510 and streamer device 1520 may include a GPGPU or GPU, such as the example GPGPUs and/or GPUs described herein with respect to FIGS. 1-13.

The cloud server device 1510 and/or streamer device 1520 may include any number and type of video, image, or graphics processing units that may provide the operations as discussed herein. Such operations may be implemented via software or hardware or a combination thereof. As illustrated, streamer device 1520 may include a decode unit 1521, a render unit 1522, input/output control devices (e.g., keyboard, mouse, gamepad, touchpad, virtual reality (VR) equipment, etc.) 1517, and a streaming capture device 1523 (e.g., camera, microphone, etc.). In one example, one or more or portions of at least the decode unit 1521 and the render unit 1522 are implemented via a processing resource, such as an execution unit (EU). The processing resource, such as the EU, may include, for example, programmable logic or circuitry such as a logic core or cores that may provide a wide array of programmable logic functions. In one example, one or more or portions of the decode unit 1521 and the render unit 1522 are implemented via dedicated hardware such as fixed function circuitry or the like including MACs to execute a neural network. Fixed function circuitry may include dedicated logic or circuitry and may provide a set of fixed function entry points that may map to the dedicated logic for a fixed purpose or function.

In one example, the cloud server device 1510 may operate as a game cloud device hosting one or more gaming bitstreams provided as output (e.g., bitstream 1503) to streamer devices, such as streamer device 1520. In one example, the content bitstream includes frames captured from the game. The decode unit 1521 receives the bitstream 1503 with captured frames. The render unit 1522 renders the bitstream 1503.

Unlike the system in FIG. 14, in the system of FIG. 15A, the streamer device 1520 sends the overlay data 1519 to the cloud server device 1510 to be combined and sent to viewers 1515. Thus, unlike conventional video streaming systems, in FIG. 15A, streaming-related operations are moved to the cloud, which minimizes loading of the end-user device and allows vide optimization techniques to be applied. According to one example, in addition to sending control data, the streamer device 1520 captures or generates overlay data to send to the cloud for composition and overlay processing. The overlay data may include, for example, one or more of: video (e.g., from a camera), audio (e.g., voice from a microphone or other audio), text (chat), images (e.g., avatars, graphics, etc.), or other data or information intended to overlay one or more of the captured frames from the game or other application. In one example, the user may generate data to be overlayed over the captured frames by, for example, recording video, recording audio, typing text, or providing or selecting some other content. The client device then transmits the overlay data to the cloud server device to be overlayed over the display capture data. In one example, the cloud server device combines the overlay data with the captured frames, encodes the combined frames using compression parameters based on statistics, and transmits the encoded combined frames to viewers.

Although only a single streamer device is illustrated in FIG. 15A, the cloud server device 1510 may apply the techniques described herein for multiple streamer devices. For example, the cloud server device 1510 may transmit a bitstream with captured frames to multiple streamer devices, receive overlay information from multiple streamer devices, combine the overlay information from multiple streamer devices with the captured frames, encode the frames using statistics, and transmit the frames to one or more viewers. Regardless of whether an implementation involves one or more multiple streamer devices, combining the overlay data with the captured frames and streaming to viewers at the cloud server reduces the computation load on the client device while enabling improved streaming quality to viewers.

Figure 15B:
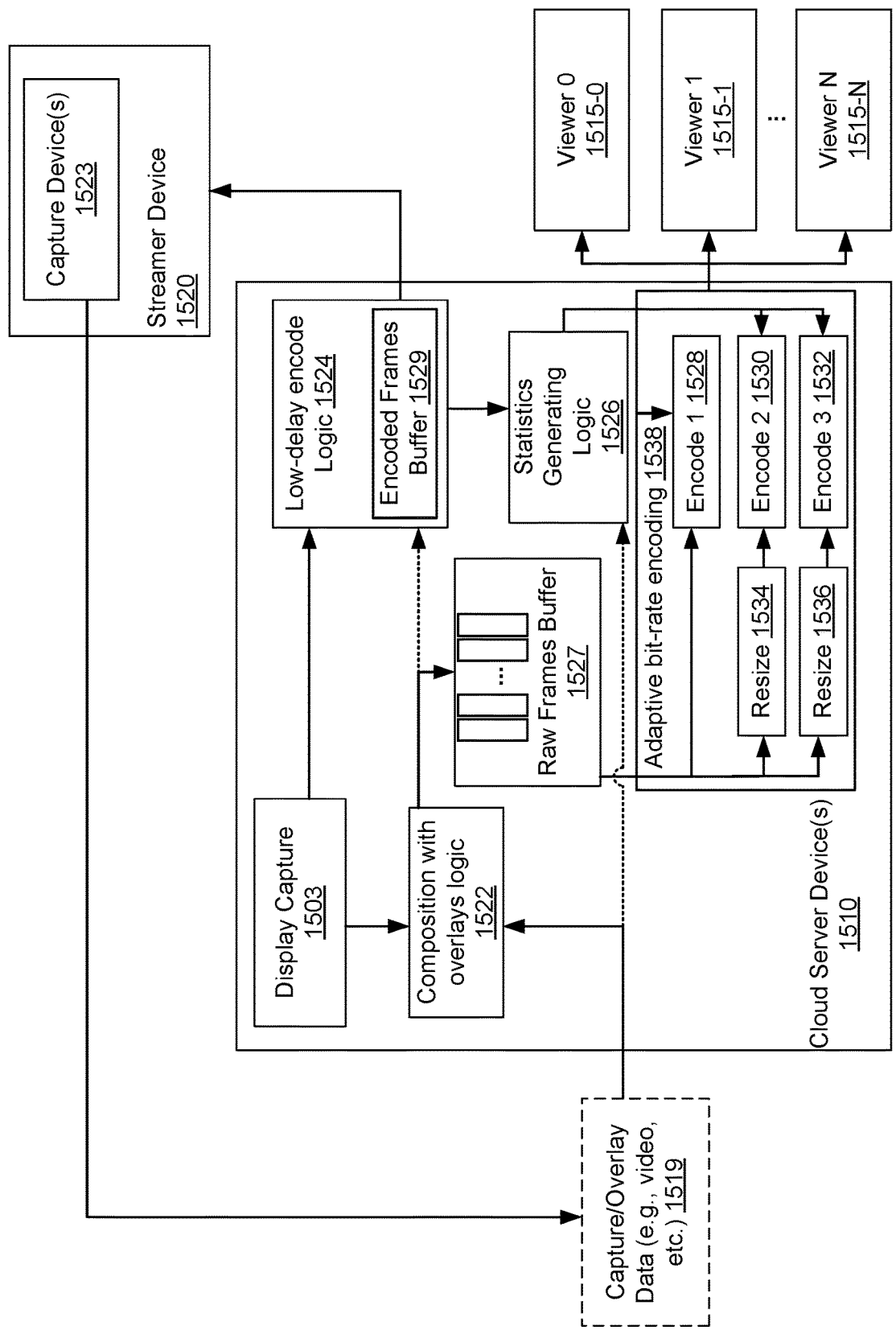
FIGS. 15B and 15C are block diagrams of examples of systems for video streaming for applications and workloads executed in cloud.
Figure 15C:
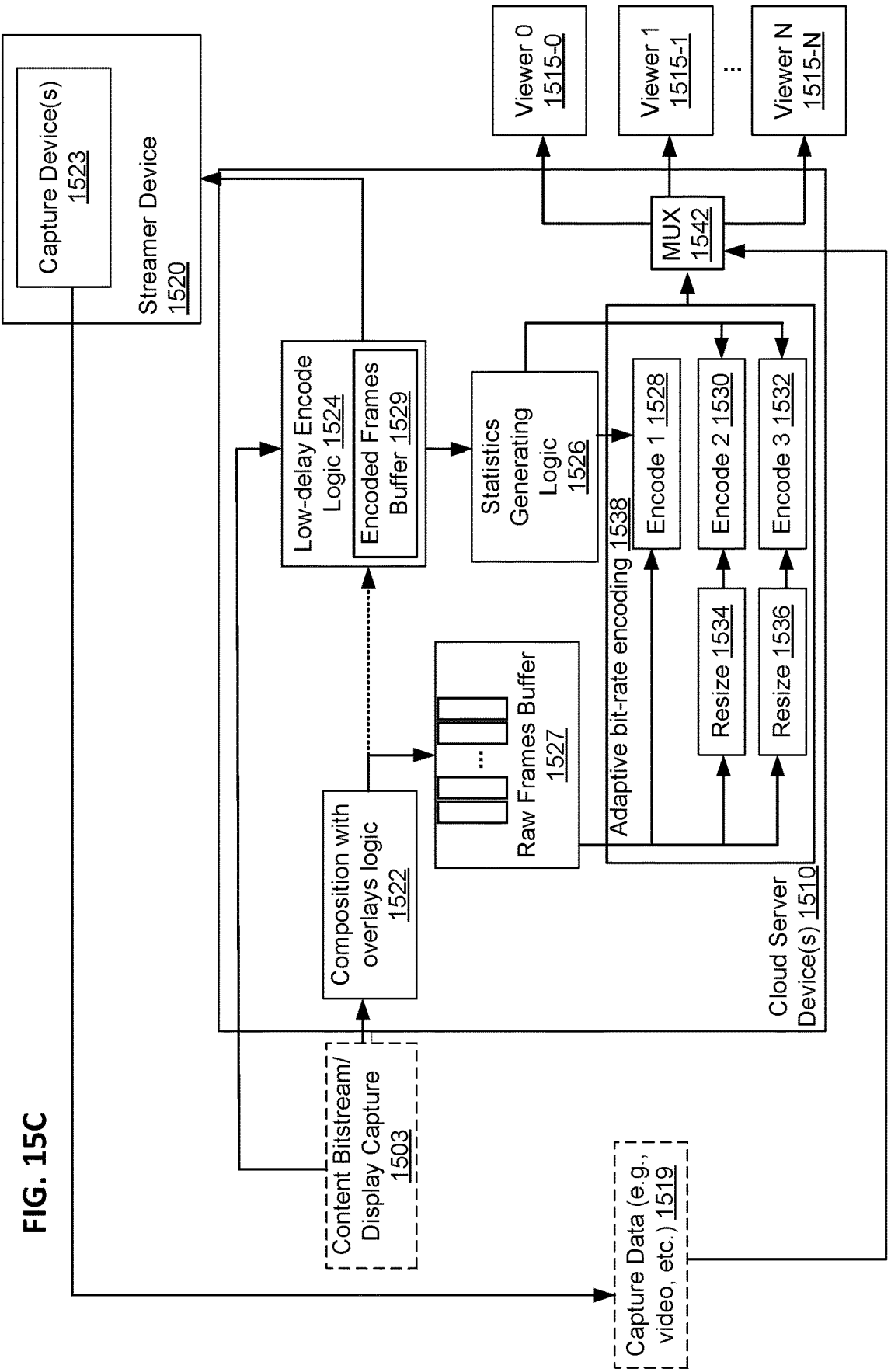

FIGS. 15B and 15C are block diagrams of examples of systems for video streaming for applications and workloads executed in cloud. The features shown and described with respect to FIGS. 15B and 15C may be implemented in software, firmware, and/or hardware. The block diagrams in FIGS. 15B and 15C show two different examples of video streaming for applications executed in the cloud. Similar to FIG. 15A, the systems in FIGS. 15B and 15C include a cloud server device 1510 communicably coupled with one or more viewer devices 115-0-115-N and a streamer device 1520.

The streamer device 1520 accesses an application running on the cloud server device and captures (or otherwise selects or generates) overlay data (e.g., with one or more capture devices 1523). The streamer device 1520 then transmits an overlay stream 1519 including overlay frames or packets to the cloud server device 1510.

The cloud server device 1510 executes an application, accesses a display capture 1503 from the application, encodes display capture frames using statistics, combines overlay data from the streamer device 1520 with the display capture frames, and transmits the combined frames to one or more viewers. In one example, the cloud server device may also generate other overlays according to streamer request or selection. The examples in FIG. 15B and FIG. 15C differ in how the frames are combined and encoded for transmission to the viewers. FIG. 15B illustrates an example in which the overlay data is composited with the display frames and then encoded and transmitted to the viewers. FIG. 15C illustrates an example in which the display frames are encoded, and then after encoding are combined with the overlay data (e.g., via MUX'ing) and transmitted to the viewers.

Turning first to FIG. 15B, a display capture 1503 from an application is provided to encode logic 1524 for encoding and transmission to the streamer device 1520, and also to composition logic 1522 for composition and encoding for transmission to viewers 1515-0-1515-N. Thus, in one example, the same captured display frames are for streamers and viewers (in contrast to existent methods with separate clouds for execution and streaming). In one example, the encode logic 1524 includes low-delay encode logic to encode the display frames with compression parameters to minimize delay of encoding and transmission to the streamer device 1520. For example, low-delay encoding may involve single pass encoding without reordering of frames (e.g., no bi-directional frames (B-frames)). In one such example, a compression parameter used for encoding for the streamer device may be: the number B-frames used in encoding equals zero. In one example, in addition to transmitting the encoded frames to the streamer device, the encoded frames are buffered (e.g., in a encoded frames buffer 1529) to enable the gathering of information or statistics from the encoded frames. The information or statistics from the encoded frames is provided to statistics generating logic 1526, discussed in more detail below.

The composition logic 1522 also receives or accesses the display capture data 1503 in addition to capture or overlay data 1519 from the streamer device 1520. The composition logic then composites or overlays the capture data 1519 over the display capture frames 1503. For example, if the capture data 1519 from the streamer device includes video frames or audio packets, each one of the video frames and/or audio packets is overlayed over a corresponding display frame. The composite frames are buffered (e.g., in the raw frames buffer 1527) and provided to adaptive bit-rate encoding logic 1538 for encoding and transmission to viewers 1515-0-1515-N. In one example, the composite frames may also be provided to the low-delay encode logic 1524 for encoding and transmission to the streamer device 1520.

In one example, the adaptive bit-rate encoding logic 1538 accesses or receives the raw composite frames and encodes the frames at multiple different resolutions and/or encoding rates for transmission to viewers at multiple different bitrates. The different resolutions and/or encoding rates enable providing the same content in multiple video streams to viewers. The viewers can switch amongst the available video stream qualities based on factors such as bandwidth (e.g., expected number of bits per unit of time that can be transmitted over a link), connection speed/throughput (e.g., the actual number of bits per unit of time being transmitted over a link), window size, and/or other factors. In the example illustrated in FIG. 15B, the adaptive bit-rate encoding logic 1538 outputs streams with three different resolutions encoded at three different encoding rates; however, an adaptive bit-rate encoder may provide fewer (e.g., 2) or more (e.g., 4, 5, 8, etc.) than three stream qualities. In the illustrated examples, one full resolution stream is generated by encoding the frames from the raw frames buffer 1527 with encoding logic 1528. A second stream is generated by resizing the frames from the raw frames buffer 1527 with resizing logic 1534 (e.g., to HD (high definition) resolution) and then encoded with encoding logic 1530. A third stream is generated by resizing the frames from the raw frames buffer 1527 with resizing logic 1536 (e.g., to 720p) and encoded with encoding logic 1532. In one example, content for viewer channels is encoded in an adaptive bitrate mode (e.g., a 1:N model where the same video frames are encoded with different resolution/bitrate for network bandwidth adjustment) and, typically, within random access mode (e.g., 10 seconds GOP (group of pictures) with B frames).

Unlike conventional encoding schemes, the adaptive bit-rate encoding logic 1538 adjusts compression parameters based on statistics gathered from the display frames encoded for the streamer device. The video channel for the streamer device requires minimum encoding latency (e.g., dozens of milliseconds) whereas other streaming channels for viewers allow for higher latency (e.g., up to seconds). Thus, the encoded frames can be buffered to obtain information/heuristics from the streamer's channel and apply it to viewers channels. In one example, the statistics can also (or alternatively) be gathered from the overlay data received from the streamer device 1520. The statistics can include, for example, one or more of frame size (e.g., number of bits in an encoded frame), frame complexity (how many small details are in the frame, for example, text or lines), the number of intra/inter/skip blocks, objective frame metrics (e.g., PSNR (peak signal-to-noise ratio) and SSIM (structural similarity index measure)), block-level information such as distortion, compressed size of blocks, and/or other statistics. Although the description refers generally to generating statistics from the compressed frames, this can include generating with respect to frames, slices or macroblocks (e.g., where a frame includes multiple slices or macroblocks/blocks), or other granularity. Thus, the statistics from the encoded frames for the streamer device and/or the overlay data from the streamer device are provided to the encoding logic blocks 1528, 1530, and 1532. The encoding logic blocks 1528, 1530, and 1532 then encode the composite frames using compression parameters to improve the quality of the streams provided to viewers.

Compression parameters that may be varied based on the statistics include, for example: compression type (e.g., whether single, two, multi-pass encoding, look-ahead encoding, or other encoding technique is used), the GOP (group of pictures) pattern (e.g., what type of frames are to be used for each frame, such as I-, P-, or B-frames), reference frame selection (e.g., decision regarding long-term reference), quantization parameter (QP) at the frame and/or block level, quantization matrices, and/or other compression parameters. In one such example, the compression parameters include one or more B-frames in the GOP pattern based on the statistics (compared to the low-delay encode for the streamer device in which typically no B-frames are used in encoding). For example, if the difference between two neighboring frames is large (e.g., the statistics from first pass indicates a lot of intra macroblocks), the encoding logic may encode the frame as an I-frame. In another example, if there is static or slow motion content (e.g., the statistics indicate many similar frames, such as the presence of inter macroblocks with a small number of coefficients), the encoding logic may use B-frames and set long-term reference at the beginning of the scene. Thus, the system of FIG. 15B captures frames after display, encodes the frames and sends them to the streamer, receives overlay data (e.g., self/avatar video) from the streamer, composites captured display frames with avatar video, and encode the resulting video using optimization hints and stream it to viewers.

The system in FIG. 15C is similar to the system in FIG. 15B, except instead of compositing the overlay data from the streamer device with the display capture data prior to adaptive bit-rate encoding, the overlay data is MUX'ed with the display capture data after the display capture data is encoded. Thus, a display capture 1503 from an application is provided to encode logic 1524 for encoding and transmission to the streamer device 1520, and also to composition logic 1522. However, in the example of FIG. 15C, the composition logic 1522 does not receive the capture data 1519 from the streamer to overlay with the display capture data 1503. Instead, if the streamer device has requested or selected some overlay data be generated at the cloud server device 1510, the cloud server-generated overlay data may be composited with the display capture data 1503. Otherwise, the display capture frames without overlay data are buffered (e.g., in buffer 1527) and provided to adaptive bit-rate encoding logic 1538. In one example, the output of the composition logic 1522 can be provided to the low-delay encode logic 1524 for encoding and transmission to the streamer device 1520.

Similar to FIG. 15B, the adaptive bit-rate encoding logic 1538 accesses or receives the raw frames (which may or may not include overlay data) and encodes the frames at multiple different resolutions and/or encoding rates for transmission to viewers at multiple different bitrates. Also like in FIG. 15B, the adaptive bit-rate encoding logic 1538 encodes the frames using compression parameters based on statistics gathered from the display frames encoded for the streamer device. After encoding, the encoded display frames are MUX'ed (e.g., using one or more multiplexors 1542) with the display frames 1519 to generate streams for transmission to viewers 1515-0-1515-N.

Figure 16:
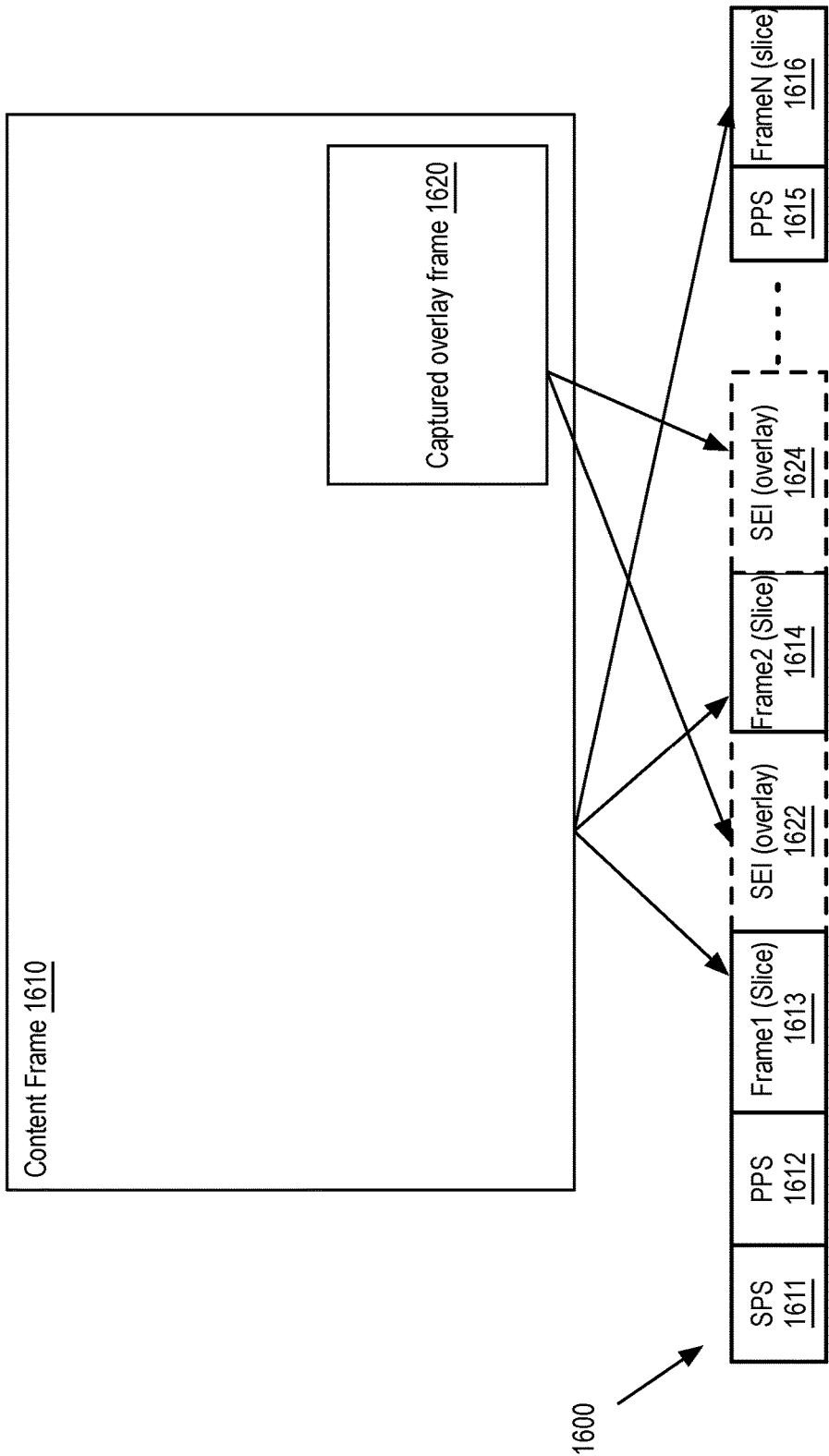
FIG. 16 is a block diagram depicting an example of how content may be multiplexed with overlay data to form a combined bitstream.

FIG. 16 is a block diagram depicting an example of how content may be multiplexed with overlay data to form a combined bitstream 1600. As illustrated, the combined bitstream 1600 includes a variety of components corresponding to a content frame 1610 of an original content bitstream (such as bitstream 1503 described with respect to FIGS. 15A-15C) multiplexed with a data corresponding to a captured overlay frame 1620 of an overlay bitstream (such as overlay bitstream 1519 described with respect to FIGS. 15A-15C). Content corresponding the content frame 1610 is depicted with solid lines in the bitstream 1600, while content corresponding to the captured overlay frame 1620 is depicted with dashed lines in the bitstream 1600. For example, sequence parameter set (SPS) 1611, picture parameter set (PPS) 1612, frame1 (slice) 1613, frame2 (slice) 1614, PPS 1615, and frameN (slice) 1616 are data representing content frame 1610, which are multiplexed (e.g., by multiplexing logic 1542) with SEI (overlay) 1622,1624 data representing captured overlay frame 1620.

Referring back to FIG. 15C, in some implementations, the multiplexing logic 1542 sends the overlay information (e.g., overlay bitstream 1519) as a separate bitstream from the content bitstream 1503 to the viewers 1515-0-1515-N.

Figure 17:
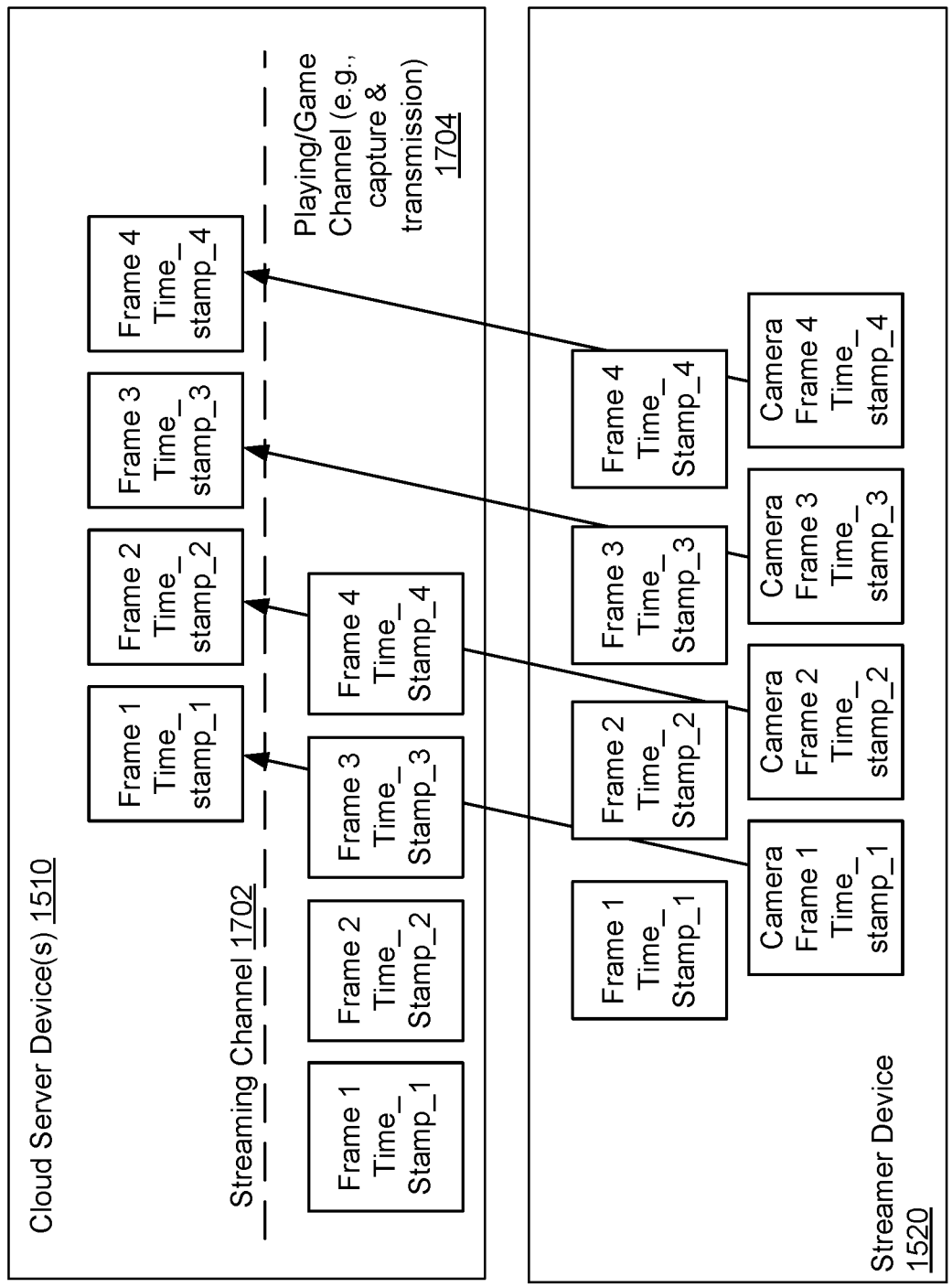
FIG. 17 is a block diagram depicting an example of how content is synchronized with overlay data to form a composite bitstream.

FIG. 17 is a block diagram depicting an example of how content is synchronized with overlay data to form a composite bitstream. As discussed above, combining the overlay data with the display frames in the cloud can reduce the load on the streamer device while also enabling higher quality streaming to viewers. To enable the cloud device to correctly combine the overlay data with the captured display frames, the streamer device indicates which frames of the overlay data correspond to which frames of the display frames. One way to indicate how the overlay data corresponds to the display frames is to transmit timestamps along with the overlay data. FIG. 17 illustrates an example of including timestamps with camera frames captured with a camera at the streamer device.

In the example illustrated in FIG. 17, the cloud server device 1510 captures and transmits game frames via the playing/game channel 1704. Referring to FIG. 15A, the playing/game channel 1704 is an example of the channel over which the bitstream with captured frames 1503 is transmitted. The cloud server device 1510 also transmits a bitstream over a streaming channel 1702 to viewers. Referring to FIG. 15B, the streaming channel 1702 is an example of the channel over which the streams are transmitted to the viewers 1515-0-1515-N after adaptive bit-rate encoding.

The streamer device 1520 receives the stream from the cloud server device, captures overlay data (e.g., camera frames with a camera), and transmits the camera frames to the cloud server device 1510 via another channel. For example, referring to FIG. 15A, the streamer device 1520 transmits the capture/overlay data 1519 to the cloud server device 1510. The bandwidth to stream camera frames of a user (self) from the streamer device 1520 to the cloud server device 1510 is typically significantly less compared to full captured video. Video of one oneself is typically mostly static and may have lower resolution (e.g., it occupies a small portion of a full picture). Additionally, there are some AI techniques (e.g., to send only some updated points instead of a full image) to minimize camera bandwidth multiple times.

In one example, synchronization between captured game frames and camera frames can be implemented using timestamps. In one example, each compressed camera frame (and associated packets) sent from the streamer device 1520 to the cloud server device includes the number of the correspondent captured frame received by streamer (e.g., game player). For example, referring to FIG. 17, the streamer device 1520 receives Frames 1-4 with corresponding timestamps 1-4 from the cloud server device 1510. The timestamps can be, for example, a POC (picture order count) number, a stamp coded in the metadata, or other information identifying the order or time of the frame. The streamer device captures camera frames and associates a timestamp with each of the camera frames. For example, the streamer device takes the frame number from the game frames and adds it to the camera frame packets. For example, referring to FIG. 17, camera frame 1 includes (or is otherwise associated with) timestamp 1, camera frame 2 includes timestamp 2, etc.

To synchronize the streaming channel 1702 with the streamer device's camera data, the cloud server device 1510 buffers one or more frames. As mentioned above, the bandwidth of the camera channel is typically much smaller than a full captured game stream; therefore, in some examples, buffering one or several frames may be sufficient. The cloud server device 1510 parses the camera packets, determines the timestamp from the camera packets, and synchronizes the captured frames in the streaming channel with camera frames. In case of any drops of camera packets, standard video error resilience mechanisms can be used (e.g., based of reference frames, prediction from healthy slices, etc.).

Figure 18:
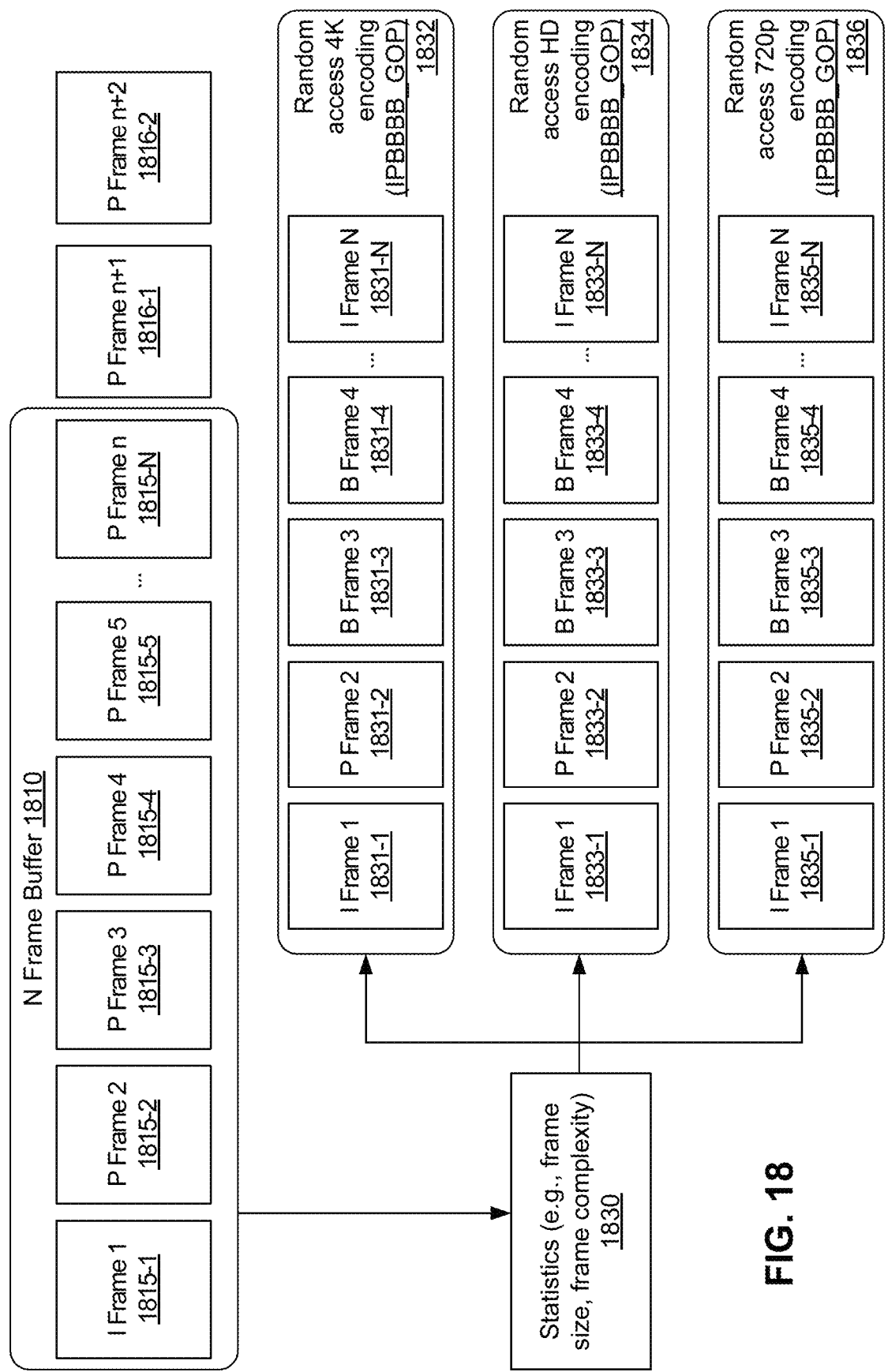
FIG. 18 is a block diagram showing an example of an encoding scheme based on gathered statistics performed in the cloud.

FIG. 18 is a block diagram showing an example of an encoding scheme based on gathered statistics performed in the cloud. As discussed above with respect to FIGS. 15B and 15C, display frames are encoded at the cloud server device for a low-delay streamer channel to the streamer device. In the example illustrated in FIG. 18, the low latency encoding encodes the frames in an IPPPPPPP GOP pattern, where I represents an "I frame" or "intra frame," which does not require other frames to be decoded, and P represents a "P frame" or "predictive frame," which relies on one or more previous frames for decompression.

A number of the encoded frames for the streamer channel (e.g., N frames 1815-1-1815-N) are buffered (e.g., in the N frame buffer 1810). For example, referring to FIGS. 15B and 15C, a number of frames are stored in an encoded frames buffer 1529. Statistics generating logic (e.g., logic 1526 of FIGS. 15B and 15C) gather or generate statistics about the buffered frames encoded for the streamer channel. The statistics may include the statistics mentioned above, for example, frame size, frame complexity, the number of intra/inter/skip blocks, objective frame metrics, block-level information such as distortion, compressed size of blocks, and/or other statistics. Statistics may also, or alternatively, be generated for the capture/overlay stream from the streamer device.

The statistics 1830 from the frames encoded for the streamer channel are then used to encode the display frames for the viewer channels. In the example illustrated in FIG. 18, three different streams are encoded at different resolutions and using compression parameters based on the statistics 1830. One stream 1832 includes frames 1831-1-1831-N encoded using random access 4K encoding. A second stream 1834 includes frames 1833-1-1833-N encoded using random access HD encoding. A third stream 1836 includes frames 1835-1-1835-N encoded using random access 720p encoding. As discussed above, multiple different resolutions and/or encoding rates enable the adaptive bit-rate streaming. The stream for the streamer device is encoded independently from than the streams for the viewers, enabling the viewer streams to have potentially higher resolution frames than the stream for the streamer device.

Figure 19:
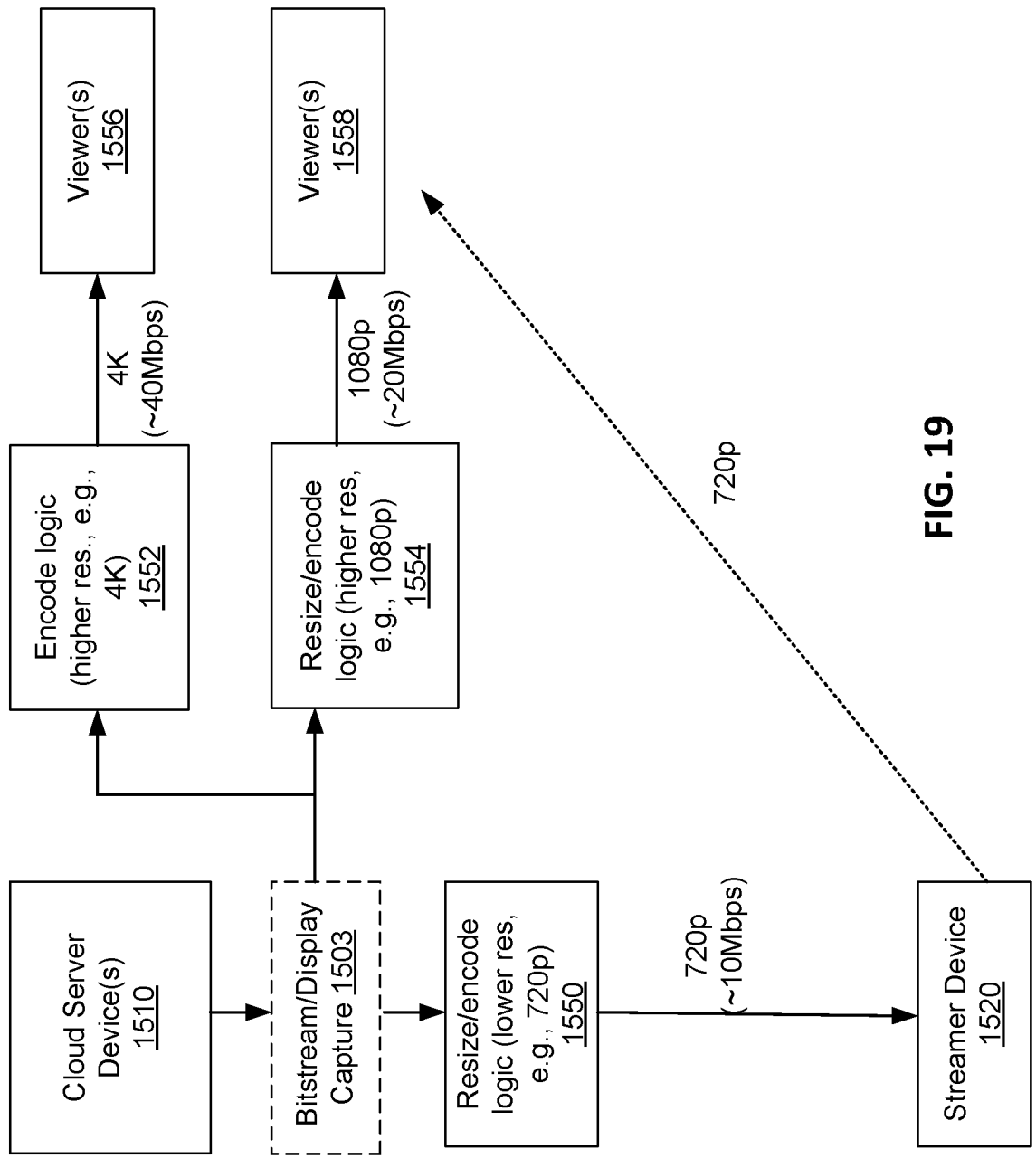
FIG. 19 is a block diagram illustrating an example of how streaming to viewers from the cloud can enable higher quality streams to viewer.

For example, FIG. 19 is a block diagram illustrating an example of how streaming to viewers from the cloud can enable higher quality streams to viewers. In FIG. 19, the cloud server device 1510 resizes the display capture 1503 with resizing and encoding logic 1550 to a lower resolution, such as 720p, which can then be transmitted to the streamer device 1520 at a relatively low bitrate (e.g., ~10 Mbps). In a conventional system in which the streamer device 1520 transmits the stream to viewers, the stream would be limited to the lower resolution stream (e.g., 720p). However, in this example, even if the stream for the streamer device has a lower resolution, one or more streams for the viewers has a higher resolution. For example, the cloud server device 1510 encodes a 4K stream with encode logic 1552 for transmission to viewers 1556 and resizes and encodes another high resolution stream at 1080p with logic 1554 for transmission to viewers 1558. The higher resolution streams are transmitted at a higher bitrate (e.g., ~40 Mbps and ~20 Mbps, respectively) to viewers with higher speed connections.

Referring again to FIG. 18, in addition to potentially having different resolutions, the streams for the viewers can be encoded differently than the stream for the streamer device. As discussed above, the stream for the streamer device is typically encoded with a low-delay encoding scheme to minimize the delay in transmission to the streamer device. In contrast, the larger delay may be acceptable in the viewers' streams, making it possible to encode the viewer streams with encoding schemes for higher compression and/or higher quality. In the illustrated example, each of the streams for the viewer channels are encoded using an IPBBBB GOP pattern, where B represents a "B-frame" or a "Bi-directional predictive frame," which relies on one or more frames prior to and after the frame for decoding. Encoding with using B-frames may decrease the average bits per encoded frame, however using B-frames may also add a delay in transmission of the stream. An increase in the delay may introduce an unacceptably high latency for the streaming device but may be acceptable for the viewers.

Figure 20:
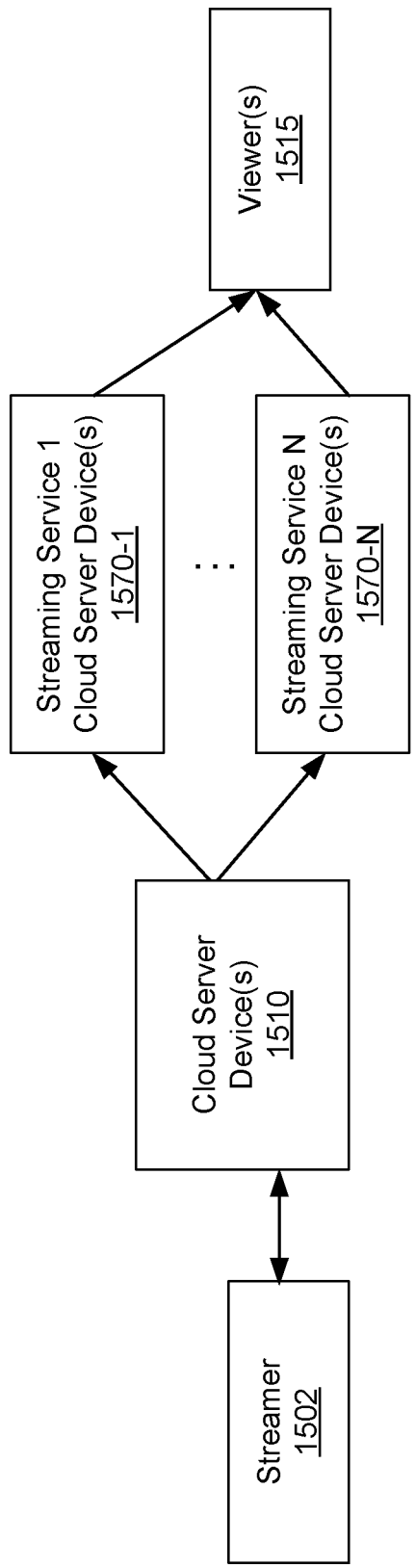
FIG. 20 is a block diagram illustrating a cloud server device transmitting a stream to a streaming service for subsequent transmission to viewers.

Although most of the examples discussed herein have referred to transmitting streams directly to viewers, the cloud server device may also, or alternatively, transmit the stream to a streaming service. For example, FIG. 20 is a block diagram illustrating a cloud server device transmitting a stream to a streaming service for subsequent transmission to viewers. In the example illustrated in FIG. 20, the cloud server device 1510 transmits a stream to the streamer 1520, encodes the stream using statistics as discussed herein, and transmits one or more streams to other cloud server devices 1570-1-1570N, which provide a streaming service. The streaming service devices 1570-1-1570-N then transmit the content to viewers 1515.

Consider an example in which a game cloud sever device transmits a game stream to a client/streamer device, and in parallel, streams to one or more other platforms on the user's behalf. In one such example, the user (game player) is the owner of the streaming content and can distribute the streams via a request or selection to the game cloud server device. A local game cloud may have wide/better channel to streaming severs than end-users, so quality (e.g., resolution, latency, encoding quality) of the streaming content may be improved. Thus, the cloud server device 1510 can generate and transmit one or more streams directly to viewers' devices, and/or to intermediate streaming platforms.

Figure 21:
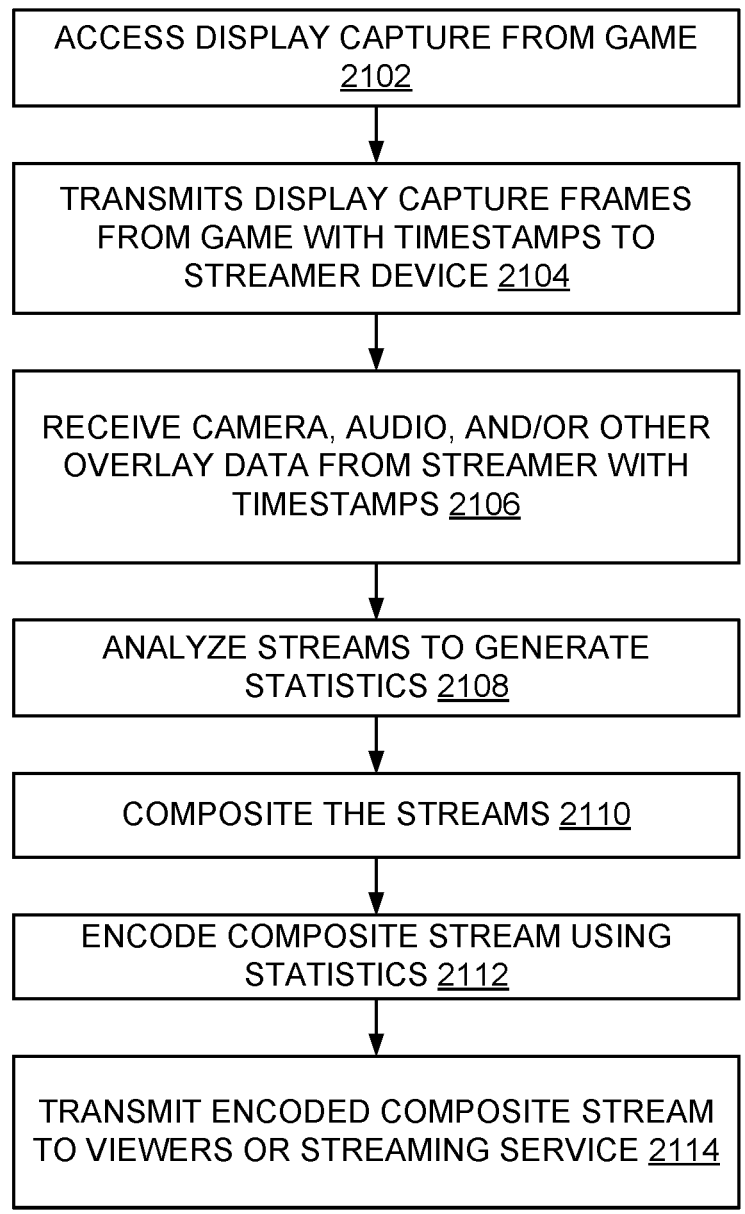
FIGS. 21-23 are flow diagrams of methods of video streaming for a game executing in the cloud.
Figure 22:
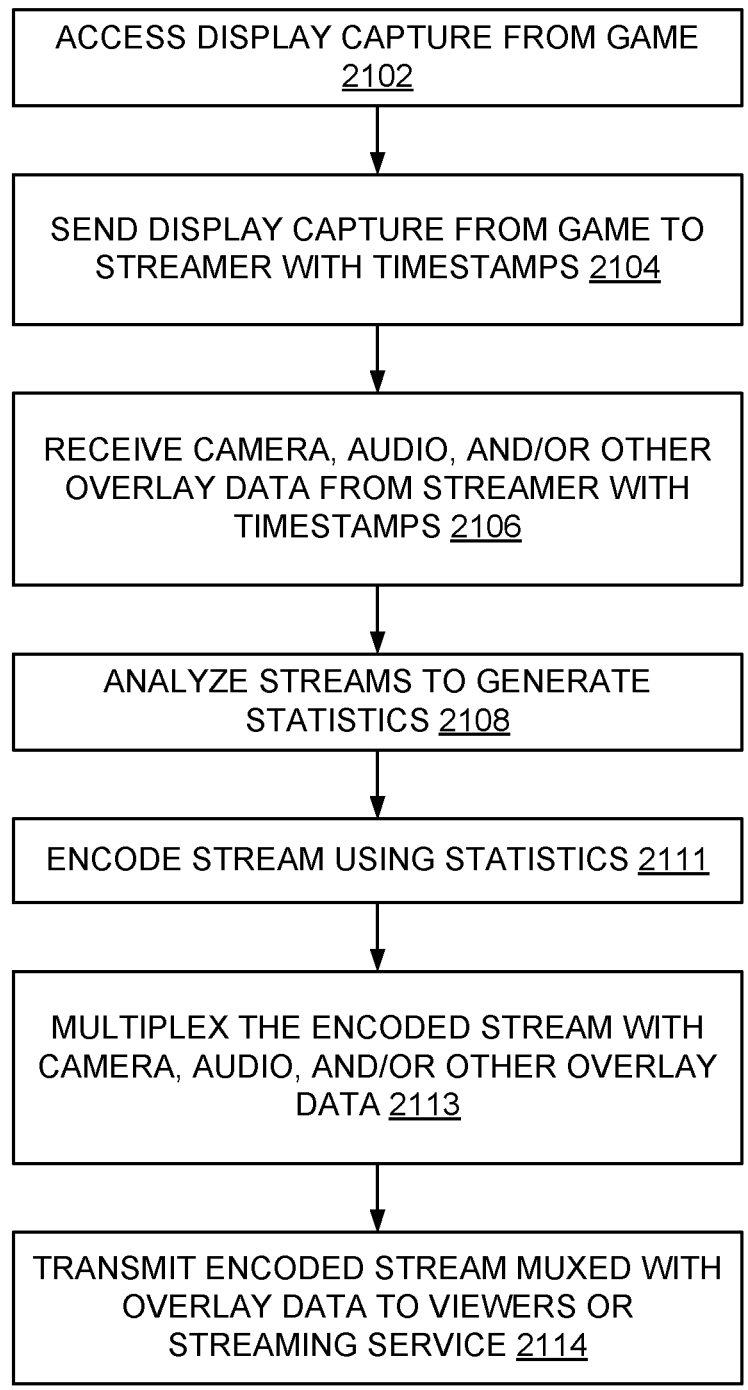
Figure 23:
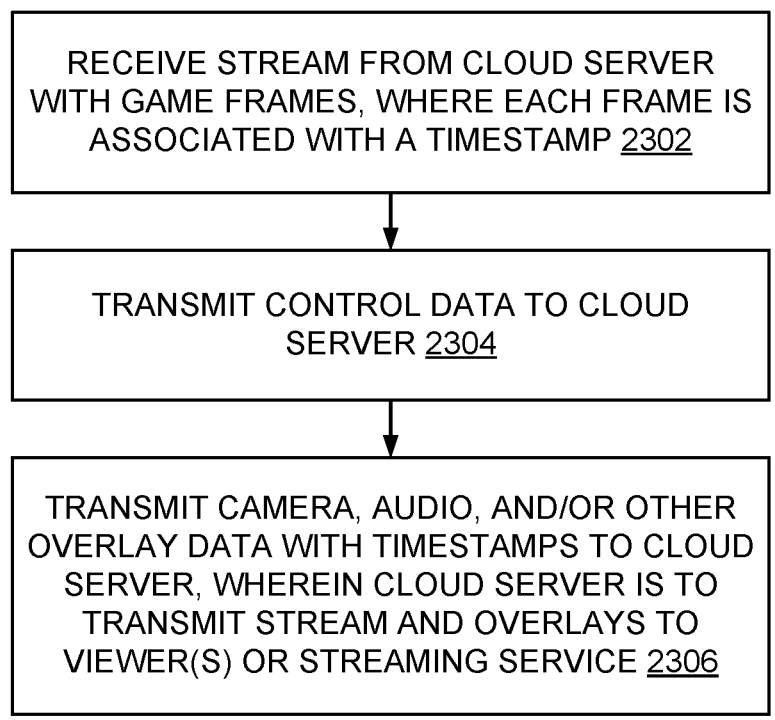

FIGS. 21-23 are flow diagrams of methods of video streaming for a game executing in the cloud. However, the methods of FIGS. 21-23 may apply to other applications or workloads executing in the cloud other than games (e.g., video conferencing, or other applications involving video streaming). FIGS. 21 and 22 are flow diagrams of methods performed at a cloud server, and FIG. 23 is a flow diagram of a method performed at a streamer/client device. The methods 2100 and 2200 of FIGS. 21 and 22 may be performed by software, firmware, and/or hardware of one or more cloud server devices. The method 2300 may be performed by software, firmware, and/or hardware of a client device.

Turning first to FIG. 21, a cloud server device accesses a display capture (e.g., display frames) from an application executing on the cloud server device, at 2102. For example, referring to FIGS. 15B and 15C, the cloud server device 1510 accesses the display capture 1503. The cloud server transmits the display capture frames from the game with timestamps to the streamer device, at 2104. For example, referring to FIGS. 15B and 15C, the cloud server device 1510 encodes and transmits game frames to the streamer device 1520. In one example, the frames are encoded with compression parameters for low-delay encoding. The cloud server device also transmits timestamps with the game frames, as discussed with respect to FIG. 17.

The cloud server device receives an overlay bitstream (e.g., camera, audio, and/or other overlay frames or packets with timestamps) from the streamer, at 2106. For example, referring to FIGS. 15B and 15C, the cloud server device 1510 receives overlay data 1519 from the streamer device 1520. For example, the bitstream transmitted to the streamer device includes a timestamp for each of the display frames, and the overlay bitstream includes a second timestamp for each of the overlay frames to associate each of the overlay frames with one of the display frames.

The cloud server device analyzes one or more of the streams to generate statistics, at 2108. For example, referring to FIGS. 15B and 15C, the statistics generating logic 1526 analyzes the frames encoded for the streamer device, and/or the capture/overlay data 1519 and generates statistics. The cloud server device then composites the display frames with the overlay frames to generate composite frames, at 2110. For example, referring to FIG. 15B, the composition with overlays logic 1522 composites the display capture frames and the overlay data. After compositing the streams, the cloud server device encodes the composite stream using statistics, at 2112. For example, the adaptive bit-rate encoding logic 1538 encodes the composite frames using compression parameters based on the statistics. The cloud server device then sends the one or more encoded composite streams to viewers of a streaming service at 2114.

The method 2200 of FIG. 22 is similar to the method 2100 of FIG. 21 except that instead of compositing the streams before encoding using the statistics, the captured display frames are first encoded using the statistics, and the MUX'ed with the overlay data. Thus, after analyzing the streams to generate statistics, at 2108, the cloud server device encodes the stream using statistics, at 2111. For example, referring to FIG. 15C, the adaptive bit-rate encoding logic 1538 encodes the display frames from the raw frames buffer 1527. The cloud server then multiplexes the overlay frames and the encoded display frames. For example, referring to FIG. 15C, the multiplexing logic 1542 combines the encoded frames with the capture data 1519. The cloud server device then transmits the encoded stream MUX'ed with the overlay data to viewers or a streaming service, at 2114.

FIG. 23 is a flow diagram of a method 2300 performed at a streamer device. The streamer device receives a stream from the cloud server with game frames, at 2302. For example, referring to FIGS. 15B and 15C, the streamer device 1520 receives the stream encoded with low-delay encode logic 1524. Each frame is associated with a timestamp, such as discussed above with respect to FIG. 17. The streamer device transmits control data to the cloud server, at 2304. For example, referring to FIG. 15A, the streamer device transmits control data 1505, such as mouse, keyboard, and/or gamepad input to the game executing on the cloud. The streamer device also transmits overlay data, such as camera, audio, and/or other overlay data with timestamps to the cloud server, at 2306. The cloud server can then transmit the stream and overlays to viewer devices or streaming server devices in accordance with examples described herein.

Thus, transmitting the stream from a cloud server to a viewer device or to an intermediate streaming service may have the benefit of moving stream-related operations to the cloud (e.g., composition, widgets, special effects, etc.). The cloud server can use statistics from the game stream and/or overlay stream to improve encoding for transmission to viewers or other streaming servers.

Examples of video streaming techniques for applications and workloads executed in the cloud follow.

Example 1: A non-transitory computer-readable medium having instructions stored thereon, which when executed by one or more processors on a cloud server device, cause the one or more processors to perform a method including accessing display frames from an application executing on the cloud server device, encoding the display frames using first compression parameters, transmitting a bitstream to a client device, the bitstream including the display frames encoded using the first compression parameters, receiving an overlay bitstream from the client device, the overlay bitstream including overlay frames, generating statistics from the display frames encoded using the first parameters, compositing the display frames with the overlay frames to generate composite frames, encoding the composite frames using second compression parameters based on the statistics, and transmitting a second bitstream to a third device, the second bitstream including the composite frames encoded using the second compression parameters.

Example 2: The method of Example 1, wherein generating the statistics includes generating the statistics from both the display frames encoded using the first compression parameters and the overlay frames.

Example 3: The method of Examples 1 or 2, wherein generating the statistics includes buffering a number of the display frames encoded using the first compression parameters, and computing, for the number of buffered encoded display frames, one or more of: frame size, frame complexity, the number of intra/inter/skip blocks, PSNR (peak signal-to-noise ratio), SSIM (structural similarity index measure), distortion, and compressed size of blocks.

Example 4: The method of any of Examples 1-3, wherein the third device includes a second client device executing a second application to view the second bitstream.

Example 5: The method of any of Examples 1-4, wherein the third device includes a second server device providing a streaming service.

Example 6: The method of any of Examples 1-5, wherein the application includes a game, the client device includes a device executing an application to play the game, and the third device includes a device executing an application to view the game.

Example 7: The method of any of Examples 1-6, wherein the bitstream is to be transmitted to the client device with a first resolution at a first bitrate, and the second bitstream is to be transmitted to the third device with a second resolution that is higher than the first resolution at a second bitrate that is higher than the first bitrate.

Example 8: The method of any of Examples 1-7, wherein encoding the composite frames using second compression parameters is further based on a bitrate requested by the third device.

Example 9: The method of any of Examples 1-8, wherein the overlay bitstream includes video frames.

Example 10: The method of any of Examples 1-9 wherein, the overlay bitstream includes audio packets.

Example 11: The method of any of Examples 1-10, wherein the overlay bitstream includes text.

Example 12: The method of any of Examples 1-11, further including generating second overlays in response to a request from the client device, and compositing the second overlays with the content bitstream.

Example 13: The method of any of Examples 1-12, wherein the bitstream includes a timestamp for each of the display frames, and the overlay bitstream includes a second timestamp for each of the overlay frames to associate each of the overlay frames with one of the display frames.

Example 14: The method of any of Examples 1-13, wherein the first compression parameters and second compression parameters include one or more of: compression type, the GOP (group of pictures) pattern, reference frame selection, quantization parameter (QP) at the frame and/or block level, and quantization matrices.

Example 15: The method of any of Examples 1-14, wherein the first compression parameters include a GOP pattern including zero bi-directional frames (B-frames), and the second compression parameters include a GOP pattern including one or more B-frames based on the statistics.

Example 16: A non-transitory computer-readable medium having instructions stored thereon, which when executed by one or more processors on a cloud storage device, cause the one or more processors to perform a method including accessing display frames from an application executing on the cloud server device, encoding the display frames using first compression parameters, transmitting a bitstream to a client device, the bitstream including the display frames encoded using the first compression parameters, generating statistics from the display frames encoded using the first parameters, encoding the display frames using second compression parameters based on the statistics, receiving an overlay bitstream from the client device, the overlay bitstream including overlay frames, multiplexing (MUX'ing) the overlay frames and the display frames encoded with the second compression parameters, and transmitting a second bitstream to a third device, the second bitstream including the MUX'ed frames.

Example 17: The method of Example 16, wherein generating the statistics includes generating the statistics from both the display frames encoded using the first compression parameters and the overlay frames.

Example 18: The method of Examples 15 or 16, wherein generating the statistics includes buffering a number of the display frames encoded using the first compression parameters, and computing, for the number of buffered encoded display frames, one or more of: frame size, frame complexity, the number of intra/inter/skip blocks, PSNR (peak signal-to-noise ratio), SSIM (structural similarity index measure), distortion, and compressed size of blocks.

Example 19: A cloud server including a memory device to store display frames from an application, and processing logic to: access the display frames from the application, encode the display frames using first compression parameters, transmit a bitstream to a client device, the bitstream including the display frames encoded using the first compression parameters, receive an overlay bitstream from the client device, the overlay bitstream including overlay frames, generate statistics from the display frames encoded using the first parameters, composite the display frames with the overlay frames to generate composite frames, encode the composite frames using second compression parameters based on the statistics, and transmit a second bitstream to a third device, the second bitstream including the composite frames encoded using the second compression parameters.

Example 20: The cloud server of example 19, wherein generation the statistics includes generation of the statistics from both the display frames encoded using the first compression parameters and the overlay frames.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A non-transitory computer-readable medium comprising instructions stored thereon, which when executed by one or more processors on a cloud server device, cause the one or more processors to at least:
   access display frames from an application executing on the cloud server device;
   encode the display frames using first compression parameters;
   cause transmission of a bitstream to a client device, the bitstream including the display frames encoded using the first compression parameters;
   cause reception of an overlay bitstream from the client device, the overlay bitstream including overlay frames;

generate statistics from the display frames encoded using the first parameters;
composite the display frames with the overlay frames to generate composite frames;
encode the composite frames using second compression parameters based on the statistics; and
cause transmission of a second bitstream to a third device, the second bitstream including the composite frames encoded using the second compression parameters.

2. The non-transitory computer-readable medium of claim 1, wherein the instructions cause the one or more processors to generate the statistics by:
generating the statistics from both the display frames encoded using the first compression parameters and the overlay frames.

3. The non-transitory computer-readable medium of claim 1, wherein the instructions cause the one or more processors to generate the statistics by:
buffering a number of the display frames encoded using the first compression parameters; and
computing, for the number of buffered encoded display frames, one or more of: frame size, frame complexity, the number of intra/inter/skip blocks, PSNR (peak signal-to-noise ratio), SSIM (structural similarity index measure), distortion, or compressed size of blocks.

4. The non-transitory computer-readable medium of claim 1, wherein:
the third device includes a second client device executing a second application to view the second bitstream.

5. The non-transitory computer-readable medium of claim 1, wherein:
the third device includes a second server device providing a streaming service.

6. The non-transitory computer-readable medium of claim 1, wherein:
the application includes a game;
the client device includes a device executing an application to play the game; and
the third device includes a device executing an application to view the game.

7. The non-transitory computer-readable medium of claim 6, wherein:
the bitstream is to be transmitted to the client device with a first resolution at a first bitrate, and the second bitstream is to be transmitted to the third device with a second resolution that is higher than the first resolution at a second bitrate that is higher than the first bitrate.

8. The non-transitory computer-readable medium of claim 1, wherein the instructions cause the one or more processors to:
encode the composite frames using second compression parameters and based on a bitrate requested by the third device.

9. The non-transitory computer-readable medium of claim 1, wherein:
the overlay bitstream includes video frames.

10. The non-transitory computer-readable medium of claim 1, wherein:
the overlay bitstream includes audio packets.

11. The non-transitory computer-readable medium of claim 1, wherein:
the overlay bitstream includes text.

12. The non-transitory computer-readable medium of claim 1, wherein the instructions cause the one or more processors to:
generate second overlays in response to a request from the client device; and
composite the second overlays with the content bitstream.

13. The non-transitory computer-readable medium of claim 1, wherein:
the bitstream includes a timestamp for each of the display frames; and
the overlay bitstream includes a second timestamp for each of the overlay frames to associate each of the overlay frames with one of the display frames.

14. The non-transitory computer-readable medium of claim 1, wherein:
the first compression parameters and second compression parameters include one or more of: compression type, the GOP (group of pictures) pattern, reference frame selection, quantization parameter (QP) at the frame and/or block level, or quantization matrices.

15. The non-transitory computer-readable medium of claim 1, wherein:
the first compression parameters include a GOP pattern including zero bi-directional frames (B-frames); and
the second compression parameters include a GOP pattern including one or more B-frames based on the statistics.

16. A non-transitory computer-readable medium comprising instructions stored thereon, which when executed by one or more processors on a cloud server device, cause the one or more processors to at least:
access display frames from an application executing on the cloud server device;
encode the display frames using first compression parameters;
cause transmission of a bitstream to a client device, the bitstream including the display frames encoded using the first compression parameters;
generate statistics from the display frames encoded using the first parameters;
encode the display frames using second compression parameters based on the statistics;
cause reception of an overlay bitstream from the client device, the overlay bitstream including overlay frames;
multiplex (MUX) the overlay frames and the display frames encoded with the second compression parameters; and
cause transmission of a second bitstream to a third device, the second bitstream including the MUX'ed frames.

17. The non-transitory computer-readable medium of claim 16, wherein the instructions cause the one or more processors to generate the statistics by:
generating the statistics from both the display frames encoded using the first compression parameters and the overlay frames.

18. The non-transitory computer-readable medium of claim 16, wherein the instructions cause the one or more processors to generate the statistics by:
buffering a number of the display frames encoded using the first compression parameters; and
computing, for the number of buffered encoded display frames, one or more of: frame size, frame complexity, the number of intra/inter/skip blocks, PSNR (peak signal-to-noise ratio), SSIM (structural similarity index measure), distortion, or compressed size of blocks.

19. A cloud server comprising:
a memory device to store display frames from an application; and
processing logic to:
access the display frames from the application;
encode the display frames using first compression parameters;

cause transmission of a bitstream to a client device, the bitstream including the display frames encoded using the first compression parameters;
cause reception of an overlay bitstream from the client device, the overlay bitstream including overlay frames;
generate statistics from the display frames encoded using the first parameters;
composite the display frames with the overlay frames to generate composite frames;
encode the composite frames using second compression parameters based on the statistics; and
cause transmission of a second bitstream to a third device, the second bitstream including the composite frames encoded using the second compression parameters.

20. The cloud server of claim 19, wherein the processing logic is to generate the statistics by:
generation of the statistics from both the display frames encoded using the first compression parameters and the overlay frames.

* * * * *